United States Patent
Reinstein et al.

(10) Patent No.: US 10,839,211 B2
(45) Date of Patent: Nov. 17, 2020

(54) SYSTEMS, METHODS AND COMPUTER PROGRAM PRODUCTS FOR MULTI-RESOLUTION MULTI-SPECTRAL DEEP LEARNING BASED CHANGE DETECTION FOR SATELLITE IMAGES

(71) Applicant: SPACEKNOW INC., San Francisco, CA (US)

(72) Inventors: Michal Reinstein, Prague (CZ); Jakub Simanek, Prague (CZ); Pavel Machalek, San Francisco, CA (US); Jan Zikes, Prague (CZ)

( * ) Notice: Subject to any disclaimer, the term of this patent is extended or adjusted under 35 U.S.C. 154(b) by 151 days.

(21) Appl. No.: 15/813,455

(22) Filed: Nov. 15, 2017

(65) Prior Publication Data

US 2019/0050625 A1 Feb. 14, 2019

Related U.S. Application Data

(60) Provisional application No. 62/542,475, filed on Aug. 8, 2017.

(51) Int. Cl.
 *G06K 9/00* (2006.01)
 *G06K 9/46* (2006.01)
 *G06K 9/66* (2006.01)

(52) U.S. Cl.
 CPC ......... *G06K 9/0063* (2013.01); *G06K 9/4633* (2013.01); *G06K 9/66* (2013.01);
 (Continued)

(58) Field of Classification Search
 None
 See application file for complete search history.

(56) References Cited

U.S. PATENT DOCUMENTS

| 8,369,567 B1 * | 2/2013 | Buck ................... G06K 9/0063 382/100 |
| 2008/0089558 A1 | 4/2008 | Vadon et al. |

(Continued)

FOREIGN PATENT DOCUMENTS

WO 2016132371 A1 8/2016

OTHER PUBLICATIONS

International Search Report and the Written Opinion of the International Searching Authority, issued in corresponding International Application No. PCT/US18/45795, dated Nov. 26, 2018, 16 pages.

(Continued)

*Primary Examiner* — Vikkram Bali
(74) *Attorney, Agent, or Firm* — Rothwell, Figg, Ernst & Manbeck, P.C.

(57) ABSTRACT

The systems, methods, and computer program products disclosed herein pertain to image analysis techniques that may exploit computer vision, supervised and unsupervised machine learning, and deep neural network models in order to detect change and determine spatio-temporal attention regions of relevant change in multi-spectral and multi-resolution satellite images. In some embodiments, the automatic detection of changes in regions over large scales of satellite imagery data may be further used to generate alerts in the context of a monitoring and alerting system. In some embodiments, the input to the system may be provided through an analytics web interface or an application programming interface (API), and the output may also be served through the web interface or API.

10 Claims, 20 Drawing Sheets

(52) U.S. Cl.
CPC ............... *G06T 2207/10036* (2013.01); *G06T 2207/20081* (2013.01); *G06T 2207/20084* (2013.01)

(56) References Cited

U.S. PATENT DOCUMENTS

| | | |
|---|---|---|
| 2010/0008598 A1 | 1/2010 | Riley et al. |
| 2011/0222781 A1 | 9/2011 | Nguyen et al. |
| 2014/0064554 A1 | 3/2014 | Coulter et al. |
| 2015/0170002 A1 | 6/2015 | Szegedy et al. |
| 2017/0076438 A1 | 3/2017 | Kottenstette et al. |
| 2018/0239982 A1* | 8/2018 | Rutschman ............ G06K 9/209 |
| 2019/0304168 A1* | 10/2019 | Korb ........................ G06K 9/52 |

OTHER PUBLICATIONS

Extended European Search Report, issued in corresponding European Application No. 18842697.7, dated Aug. 27, 2020, 10 pages.
Zhang et al. "Change detection based on deep feature representation and mapping transformation for multi-spatial-esolution remote sensing images" Isprs Journal of Photogrammetry and Remote Sensing, vol. 116, Mar. 12, 2016, pages 24-41.

\* cited by examiner

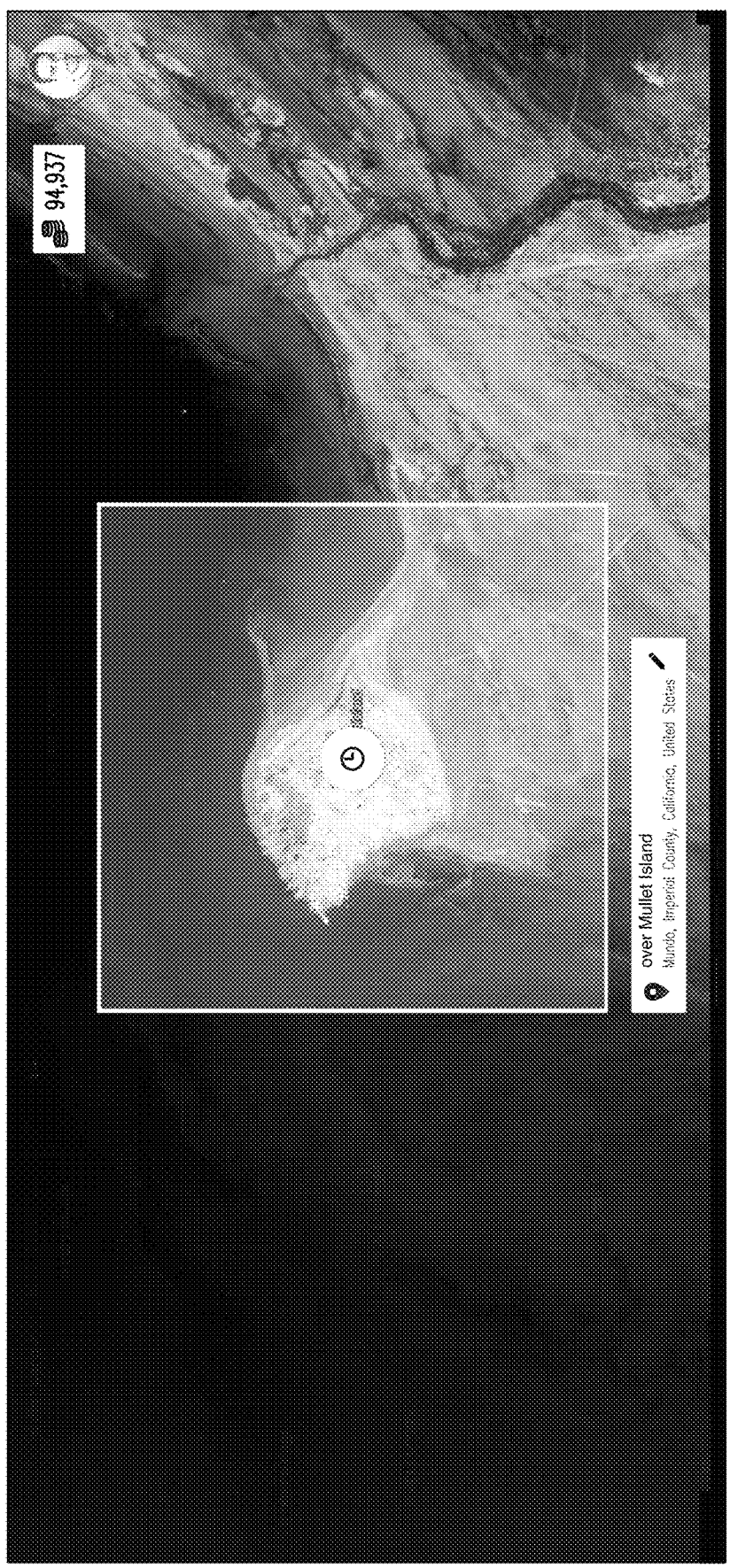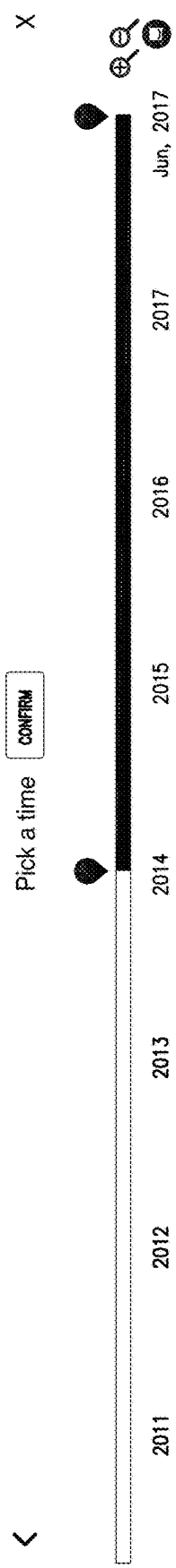
FIG. 15

SYSTEMS, METHODS AND COMPUTER PROGRAM PRODUCTS FOR MULTI-RESOLUTION MULTI-SPECTRAL DEEP LEARNING BASED CHANGE DETECTION FOR SATELLITE IMAGES

CROSS REFERENCE OF RELATED APPLICATION

This application claims the benefit under 35 U.S.C. § 119(e) of the filing date of the provisional patent application Ser. No. 62/542,475 filed Aug. 8, 2017, the disclosure of which is incorporated herein by reference.

TECHNICAL FIELD

Embodiments disclosed herein generally relate to systems, methods and computer program products for automatic analysis and processing of multi-spectral multi-resolution satellite images, including detecting changes over two or more satellite images.

BACKGROUND

Satellite imagery may be captured at many different types of resolution: spatial, spectral, temporal, radiometric, geometric, etc. Spatial resolution may refer to the pixel size of an image representing the size of the surface area (e.g., meters squared) being measured on the ground. Spectral resolution may refer to the wavelength interval size and number of intervals that the satellite image sensor is measuring. For example, certain satellites may capture image data on sixteen spectral bands, including three visible channels, four channels including three visible and near-infrared channel, and ten infrared channels, whereas others may capture image data on fewer channels. Temporal resolution may refer to the amount of time that passes between imagery collection periods for a given surface location. Radiometric resolution may refer to the ability of a satellite imaging system to record many levels of brightness (e.g., contrast) and the effective bit-depth of the sensor (e.g., number of grayscale levels). Geometric resolution may refer to the satellite sensor's ability to image a portion of the Earth's surface in a single pixel and may be expressed in terms of Ground sample distance (GSD). For example, if the GSD of a satellite is 50 meters, then the smallest unit that maps to a single pixel within an image is approximately 50 meters×50 meters. Thus, the resolution of satellite images may vary greatly depending on the instruments used and the altitude of the satellite's orbit.

Satellite image analysis systems face a number of challenges. For example, they may not process satellite imagery of different resolutions or spatial frequencies. Moreover, such systems do not offer the user the ability to select specific filtering and/or masking techniques to apply to the images according to the user's needs, such as detecting changes in satellite images over time.

SUMMARY

Accordingly, there is a need for systems, methods and computer program products for automatic analysis of multi-spectral, multi-resolution satellite images from various providers. The systems, methods and computer program products disclosed herein may exploit a number of different image analysis techniques, including computer vision techniques, both supervised and unsupervised machine learning techniques, and deep neural network models in order to detect change and determine spatio-temporal attention regions of relevant change in multi-spectral and multi-resolution satellite images. In some embodiments, the automatic detection of changes in regions over large scales of satellite imagery data may be further used to generate alerts in the context of a monitoring and alerting system. In some embodiments, the input to the system may be provided through an analytics web interface or an application programming interface (API), and the output may also be served through the web interface or API.

In one aspect, a computer-implemented method for transforming a satellite image is provided. The method includes the step of obtaining a first satellite image and a second satellite image of equal or different resolution. The method includes the step of contrast pre-processing the first and second satellite image across a plurality of spectral bands. The method includes the step of rescaling one or both of the satellite images with respect to a predetermined resolution. The method includes the step of calibrating the first satellite image and the second satellite image across the plurality of spectral bands. The method includes the step of co-registering the first satellite image and the second satellite image in a data source.

In another aspect, a computer implemented method for change detection analysis on a satellite image is provided. The method includes the step of obtaining a first satellite image at a first multi-spectral resolution and a second satellite image at a second multi-spectral resolution different than the first resolution. The method includes the step of receiving user input pertaining to an instruction for analyzing the first and second satellite images. The method includes the step of generating a first binary mask for the first satellite image and a second binary mask for the second satellite image. The method includes the step of identifying one or more spatio-temporal changes between the first satellite image and the second satellite image, wherein the identifying comprises clustering satellite image data of the first and second satellite images and the first and second binary masks of the first satellite image into different classes. The method includes the step of generating a graphical visualization of the identified one or more spatio-temporal changes.

BRIEF DESCRIPTION OF THE DRAWINGS

The accompanying drawings, which are incorporated herein and form part of the specification, illustrate various embodiments.

FIG. 15 is a screen capture of a web interface for selecting a range of dates for satellite image change detection, according to some embodiments.

DETAILED DESCRIPTION

The present invention is directed to systems, methods and computer program products for automatic analysis and processing of satellite images in order to detect and localize regions of relevant change between two or more satellite images from a selected geographical location. The analysis may be performed on large scale, multi-resolution, multi-spectral satellite imagery data from several satellite image providers.

The present invention offers the ability to automatically monitor areas of interest for specific types of change or general changes in order to trigger alerts. The ability to smart transform and analyze multi-resolution images from different satellite providers means more information may be extracted from images, leading to more accurate or complete analysis of changes.

Figure 1:
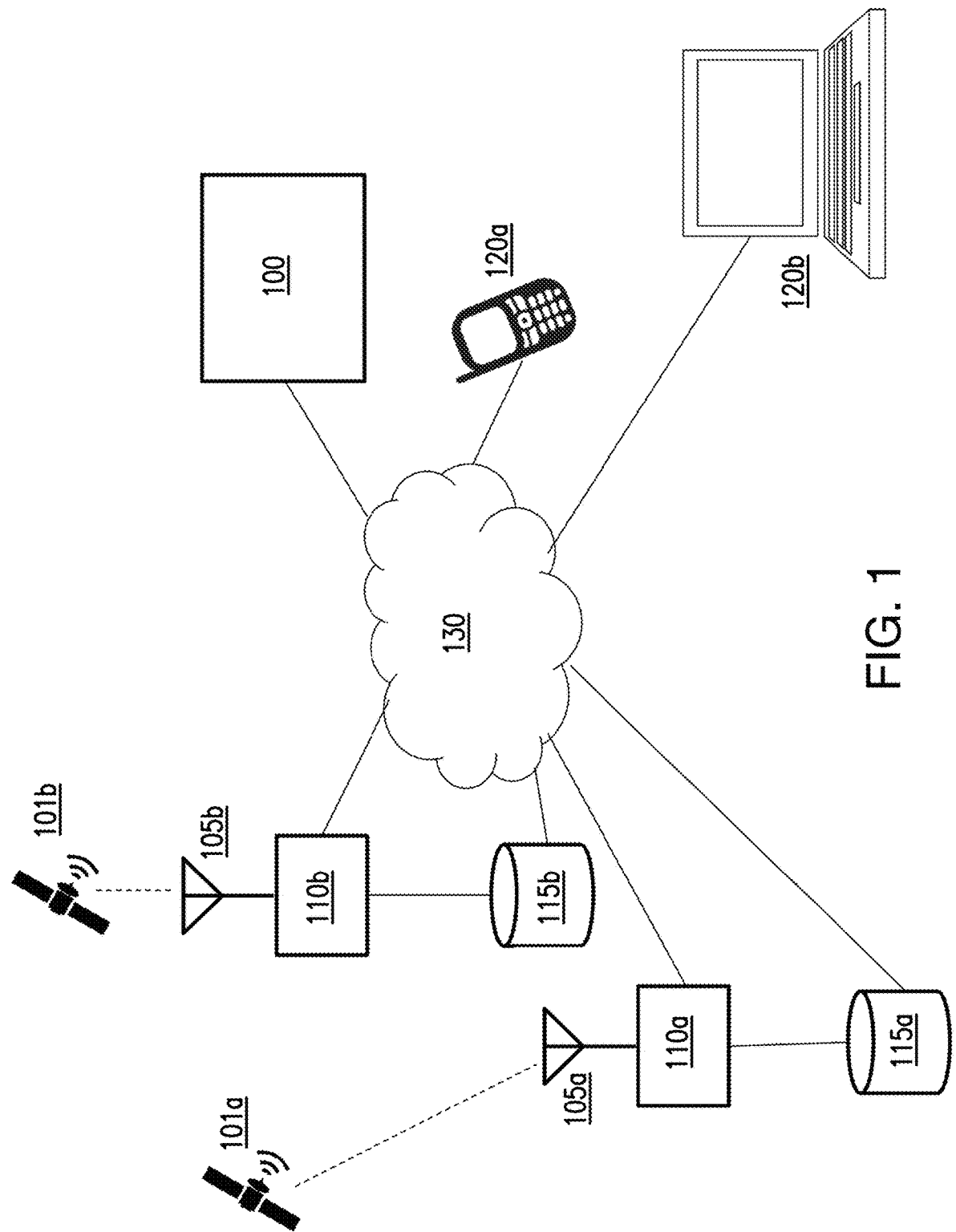
FIG. 1 is a block diagram illustrating a satellite image analysis system, according to some embodiments.

FIG. 1 is a block diagram illustrating a satellite image analysis system, according to some embodiments. A plurality of satellites 101*a-b* may be in communication (e.g., by radio waves) with one or more antennas or receivers 105*a-b*, which in turn may be coupled to one or more data processing units or computers 110*a-b*. In some embodiments, the plurality of satellites 101*a-b* transmit satellite image data captured in space to receivers 105*a-b*, which are coupled to computers 110*a-b*. Computers 110*a-b* may analyze the captured image data, and optionally store the captured satellite image data in one or more satellite image data sources 115*a-b*, such as a database.

Satellites 101*a-b* may capture image data at a plurality of different spatio-temporal resolutions. As described herein, the captured satellite image data may be referred to generically as a satellite image data cubes, reflecting the fact that a satellite image may capture data across a plurality of channels.

The one or more computers 110*a-b* may further process the captured satellite image data. For example, computers 110*a-b* may generate a data mask in order to identify valid and non-valid data in a satellite image captured by satellites 101*a-b*. For example, the valid data mask may indicate, on a pixel-by-pixel basis, which pixels are valid or not valid based on one or more criteria. In some embodiments, computers 110*a-b* and/or satellite image data sources 115*a-b* may be in electronic communication with a computer network 130. For example, network 130 may be a local area network or a wide area network (e.g., the Internet).

In some embodiments, a change detection system for satellite images 100 may be coupled to the network 130. In some embodiments, change detection system 100 may be in electronic communication with one or more computers 110*a-b*, satellite image data sources 115*a-b*, and/or one or more client devices 120*a-b*, such as mobile devices, laptops, tablets, desktops, and the like. As described in further detail below, in some embodiments, input to the change detection system 100 from client devices 120*a-b* may be provided through an analytics web interface or an application programming interface (API), and the output from the change detection system 100 may also be served through the web interface or API.

While change detection system 100 is illustrated in FIG. 1 as a single computer for ease of display, it should be appreciated that the change detection system 100 may be distributed across multiple computer systems. For example, change detection system 100 may comprise a network of remote servers and/or data sources hosted on network 130 (e.g., the Internet) that are programmed to perform the processes described herein. Such a network of servers may be referred to herein as the "backend" of change detection system 100.

Figure 2:
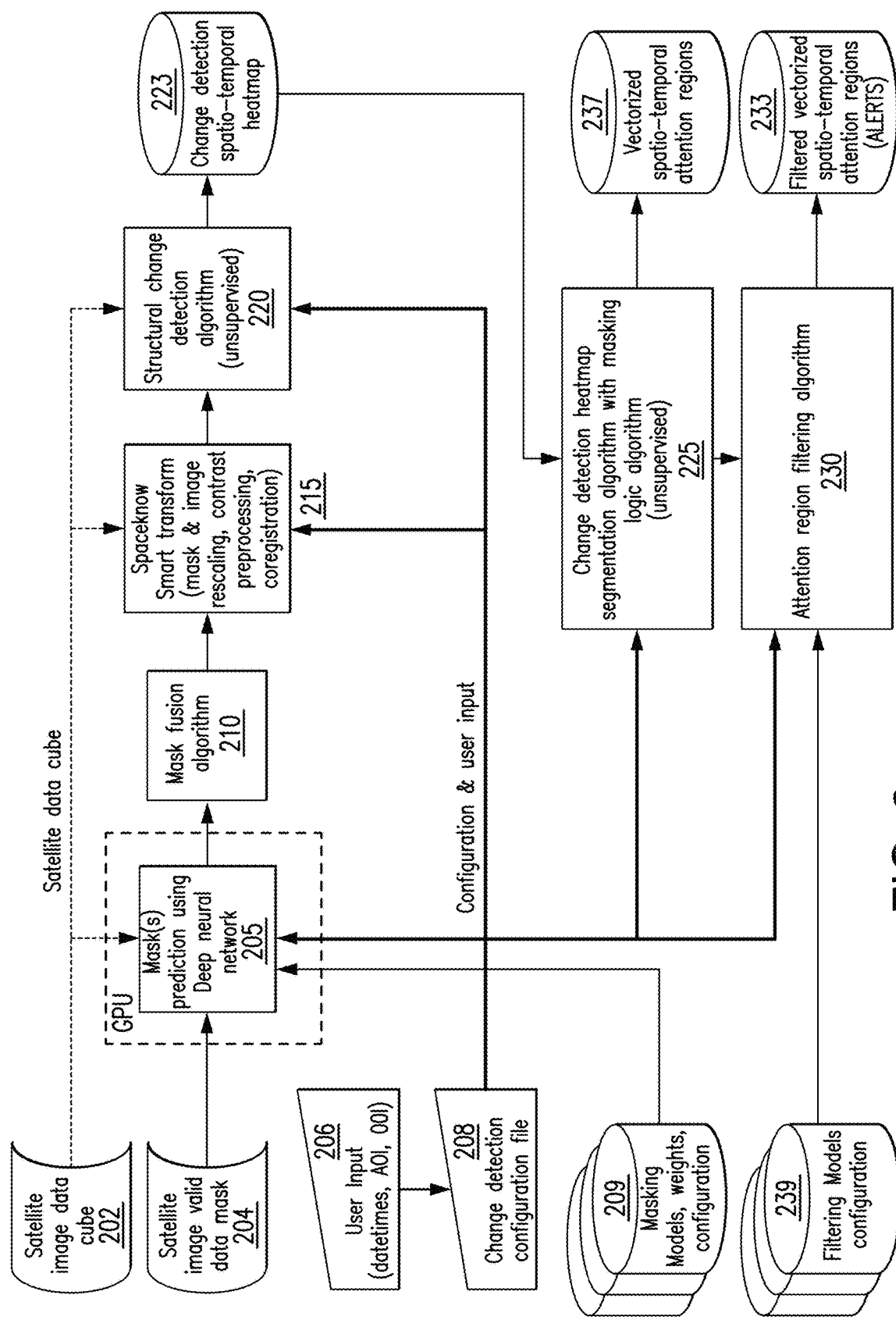
FIG. 2 is a data flow diagram of a process for multi-resolution, multi-spectral change detection for satellite images, according to some embodiments.

FIG. 2 is a data flow diagram for multi-resolution, multi-spectral change detection for satellite images. The change detection system 100 may comprise some or all of the modules 205, 210, 215, 220, 225, and 230 and data storage units 223, 209, 237, 239, and 233 depicted in FIG. 2. The six modules of change detection system 100 will now be described in detail below, included the flow of data to, from, and between these modules.

The change detection system 100 may obtain a plurality of satellite images from approximately the same geographical location. In some embodiments, change detection system 100 obtains a pair of satellite images. Each of the obtained satellite images may comprise a satellite image data cube 202 and a satellite image valid data mask 204, as described above. As described in connection with FIG. 1, the pair of satellite images may be obtained from computers 110*a-b* and/or satellite image data sources 115*a-b* over a network 130, or from a backend system of change detection system 100.

The change detection system 100 also obtains user input 206. The user input may comprise one or more date and time specification, area of interest (AOI), and/or object of interest (OOI) pertaining to a desired satellite image analysis task. As described above in connection with FIG. 1, the user input may be obtained from a user device 120 through an analytics web interface or an application programming interface (API) over network 130. FIGS. 14-17, described in further detail below, illustrate exemplary web interfaces for capturing such user input.

In some embodiments, the user input is used to generate a change detection configuration file 208. In some embodiments, the change detection system 100 generates the change detection configuration file 208, which provides computer-readable instructions to change detection system 100 based on the user input. In some embodiments, the change detection configuration file contains set of parameters describing the type of change to be detected by change detection system 100.

Change detection system 100 may provide to a mask prediction module 205 a plurality of satellite images (e.g., satellite image data cube 202 and satellite image valid data mask 204 for each image), user input 206, and/or change detection configuration file 208. In some embodiments, change detection system 100 may further provide to the mask prediction module 205 one or more masking models, weights, and configuration data from data source 209, described in further detail below in connection with FIGS. 9-10.

In some embodiments, the mask prediction module 205 comprises a deep neural network, the training of which is described in further detail below in connection with FIGS. 9-10. The mask prediction module may output predicted masks for each of the input satellite images. In some embodiments, a predicted mask may be a binary mask as shown in FIG. 3, or multi-class mask, as shown in FIG. 4.

Figure 3:
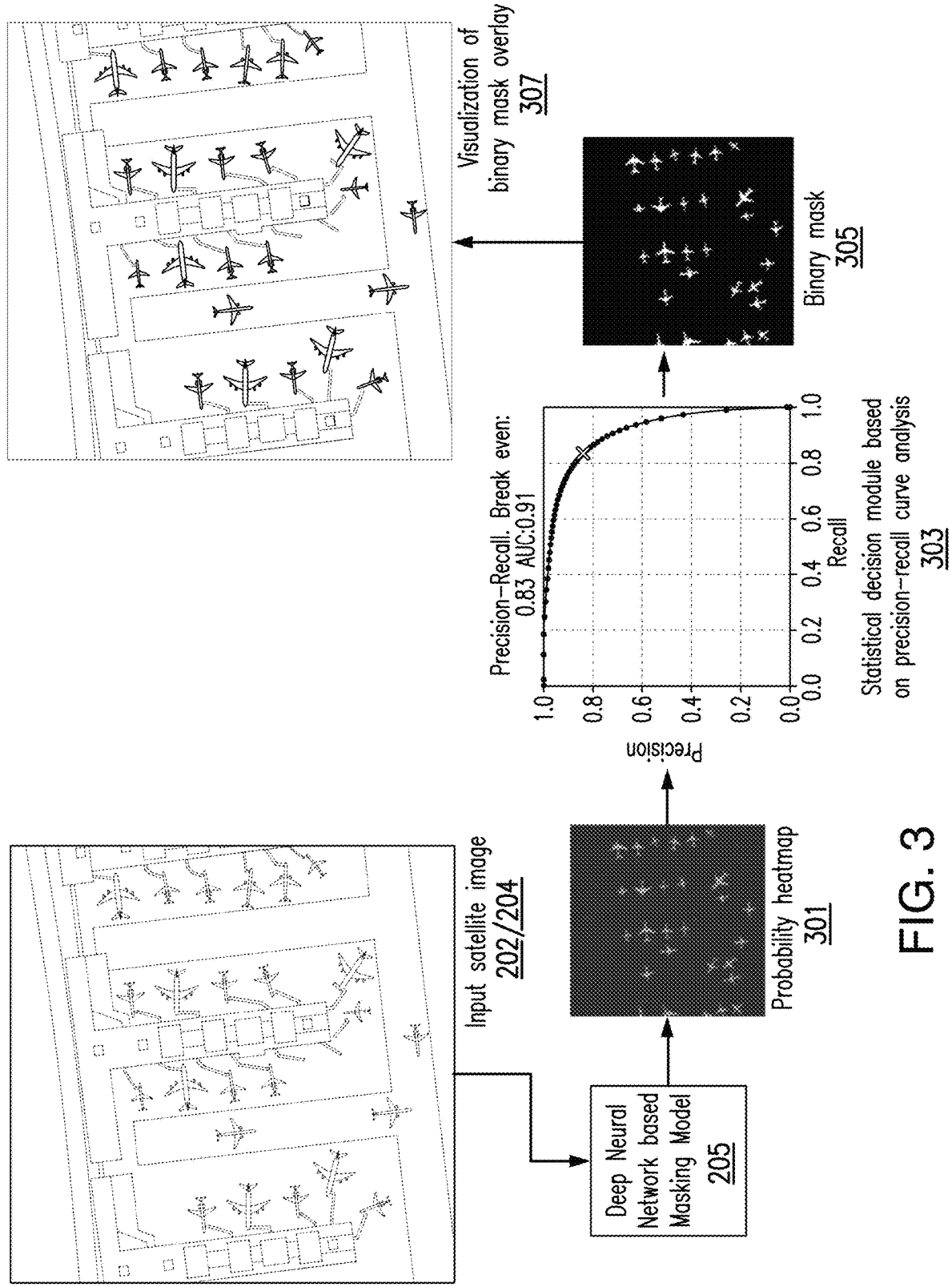
FIG. 3 is a flow diagram of a process for using a deep neural network based masking model for predicting a binary mask, according to some embodiments.

FIG. 3 is a flow diagram of a process for using a deep neural network based masking model for predicting a binary mask, according to some embodiments. As shown in FIG. 3, satellite image data (e.g., satellite image data cube 202 and satellite image valid data mask 204 of FIG. 2) is provided as input to the deep neural network based masking model of mask prediction module 205. The model may generate a probability heatmap 301 of a mask, and utilize a statistical decision model based on a precision-recall curve analysis 303. The output from the statistical decision model 303 may comprise a binary mask 305 for the input satellite image. A visualization 307 of the binary mask over the input satellite image is further depicted in FIG. 3. As shown in this example, the binary mask identifies pixels in the input satellite image that correspond to an airplane.

Figure 4:
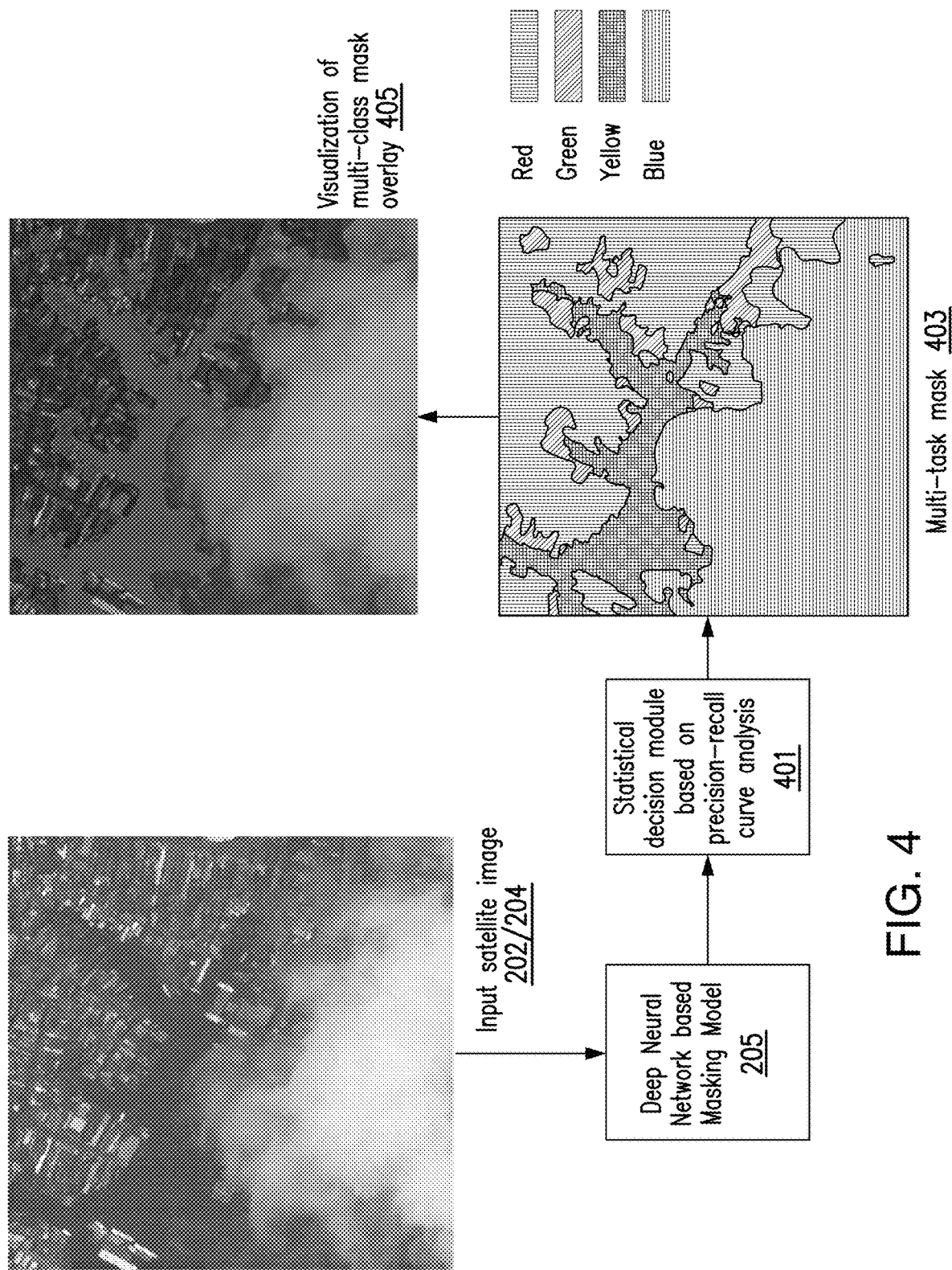
FIG. 4 is a flow diagram of a process for using a deep neural network based masking model for predicting a multi-class mask, according to some embodiments.

FIG. 4 is a flow diagram of a process for using a deep neural network based masking model for predicting a multi-class mask, according to some embodiments. As shown in FIG. 4, satellite image data (e.g., satellite image data cube 202 and satellite image valid data mask 204 of FIG. 2) is input into the deep neural network based masking model of mask prediction module 205. The model may utilize a statistical decision model based on a precision-recall curve analysis 401. The output from the statistical decision model 401 may comprise a multi-class mask 403 for the input satellite image. FIG. 4 depicts a visualization 405 of the multi-class mask 403 over the input satellite image 202/204. In this example, the output from mask prediction module 205 comprises a multi-class mask 403 that identifies pixels in the input satellite image that correspond to water (yellow), urban (red), non-urban (green), and clouds (blue).

Referring back to FIG. 2, the mask prediction module 205 of change detection system 100 may provide the predicted mask to a mask fusion module 210. The mask fusion module may comprise an algorithm for determining what area(s) of the input satellite images 202, 204 will be used for change detection, based on the user input 206 and configuration file 208.

Figure 5A:
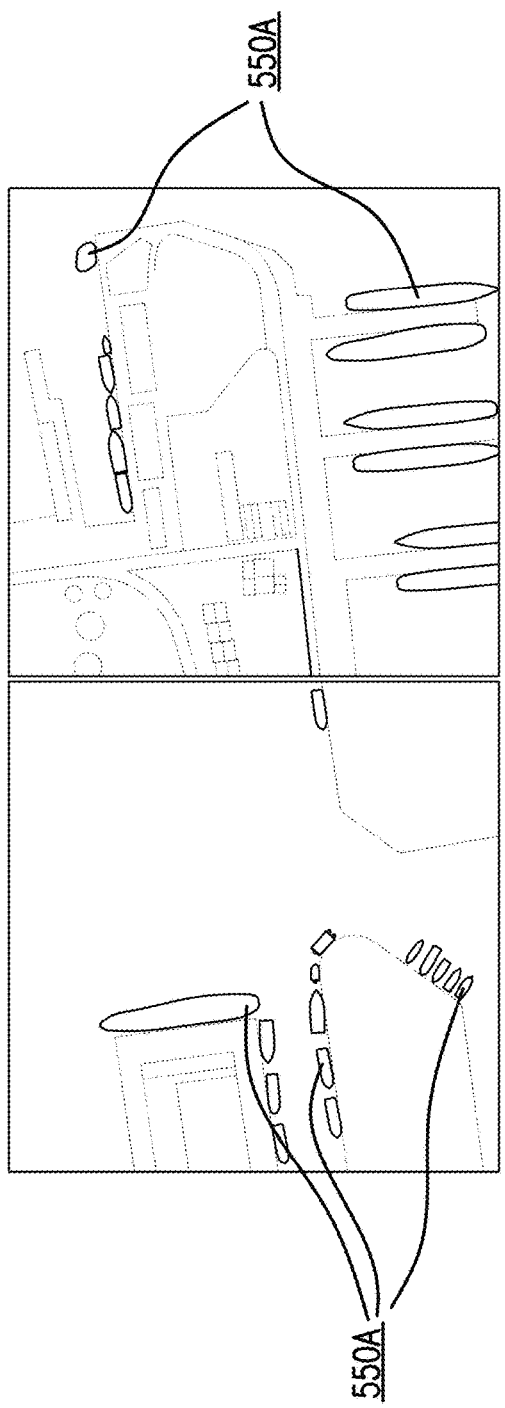
FIG. 5A is an example output from a mask fusion module, according to some embodiments.
Figure 5B:
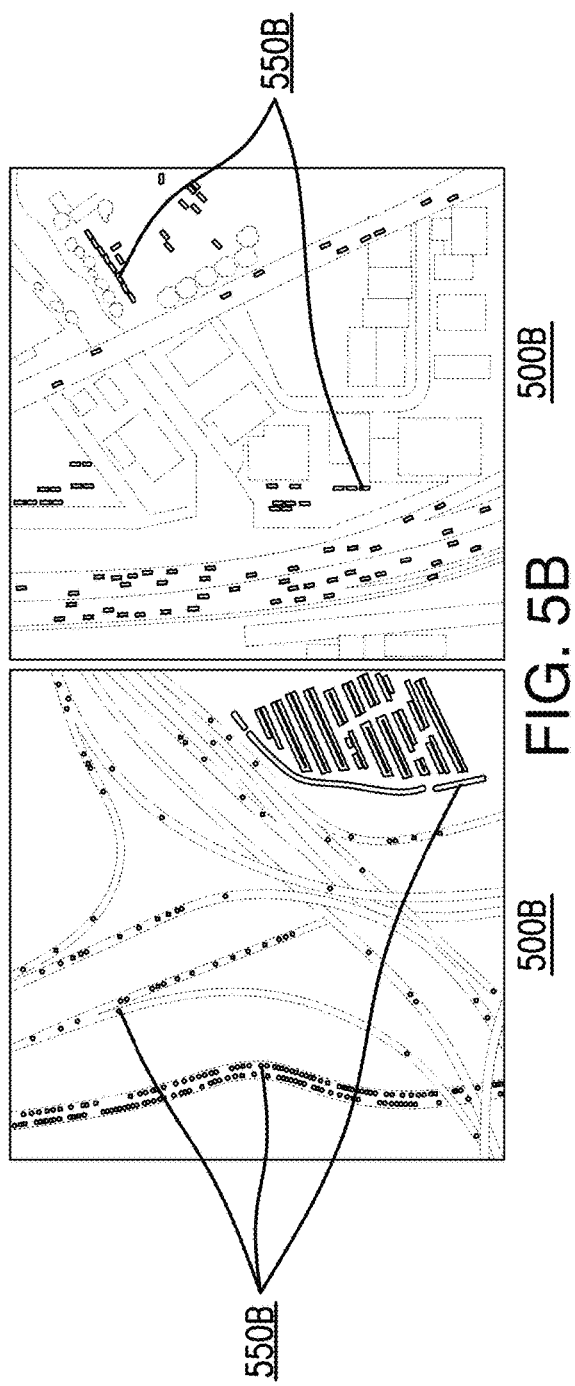
FIG. 5B is an example output from a mask fusion module, according to some embodiments.
Figure 5C:
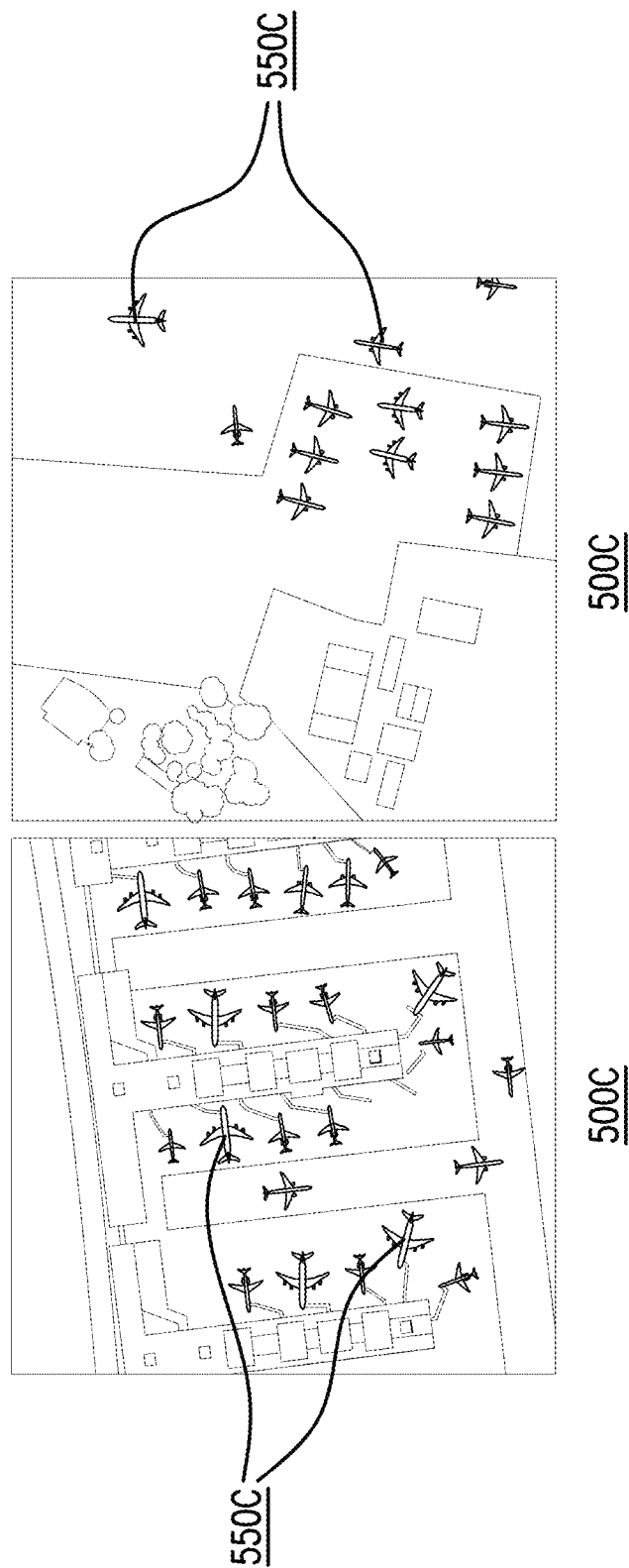
FIG. 5C is an example output from a mask fusion module, according to some embodiments.

FIGS. 5A-C illustrate example output from the mask fusion module 210, including satellite images 500 and their associated masks 550. For example, in the case where the user input 206 and change detection configuration file 208 reflect an instruction that the user wishes to analyze changes in the locations of ships in satellite images, the mask fusion algorithm may output a binary mask 550A for a plurality of satellite images 500A as shown in FIG. 5A indicating the presence of ships. Likewise, where the user input 206 reflects that the user wishes to analyze the locations of vehicles or airplanes, the mask fusion algorithm may output binary masks 550B-C indicating the presence of vehicles or airplanes in satellite images 500B-C as shown in FIGS. 5B-C, respectively.

Referring back to FIG. 2, the satellite images are provided to a smart transform module 215. In some embodiments, the output from the mask fusion module 210, and the configuration file 208 and/or user input 206 are provided to the smart transform module 215. In some embodiments, the smart transform module 215 performs contrast pre-processing, resolution rescaling, calibration using histogram matching, and relative registration of the satellite images, as described in further detail below in connection with FIG. 11. The smart transform module 215 may provide as output transformed versions of the input satellite images and associated predicted and fused masks.

Figure 6:
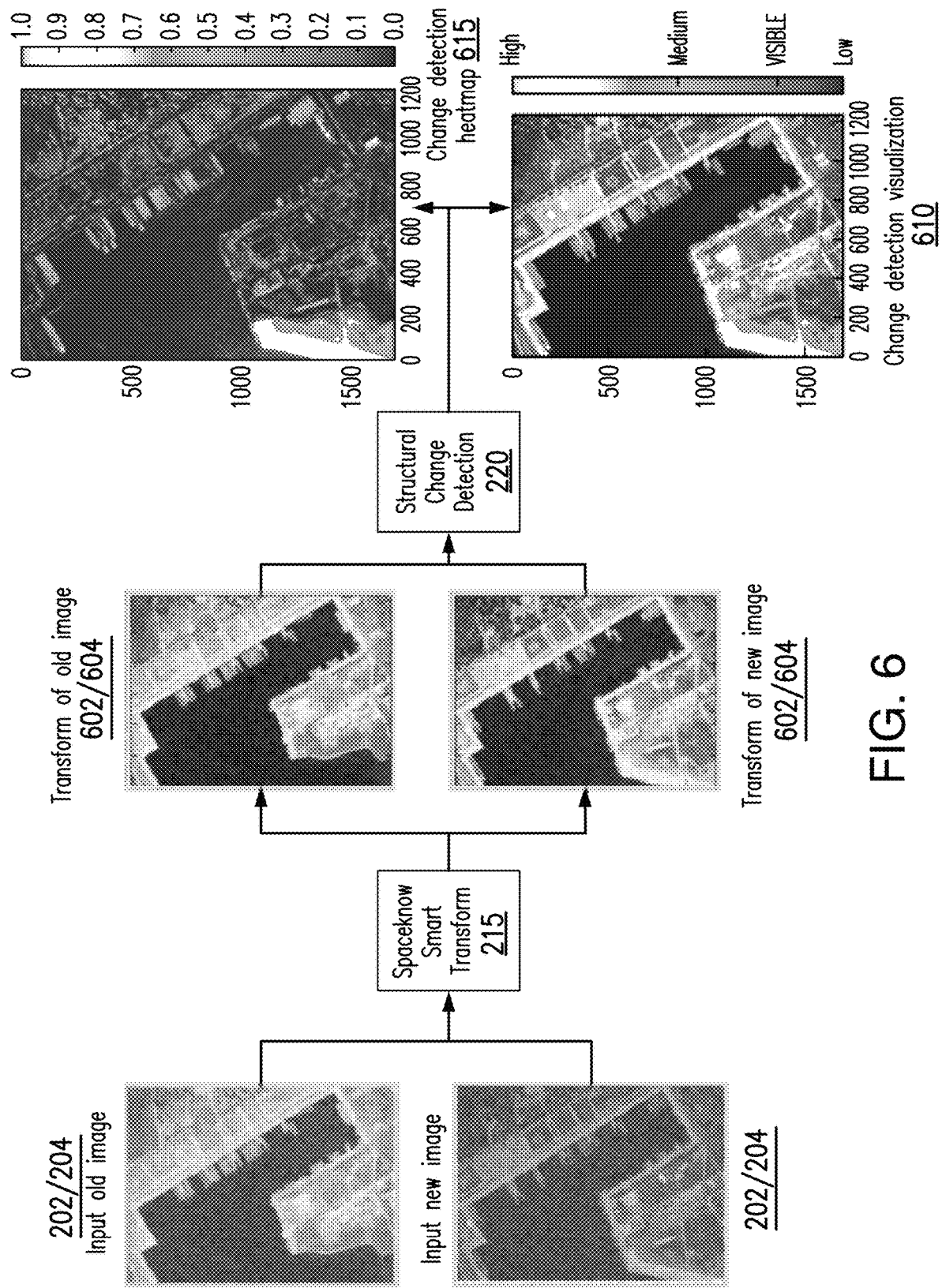
FIG. 6 is a flow diagram of a process for using an unsupervised structural change detection algorithm, according to some embodiments.
Figure 7:
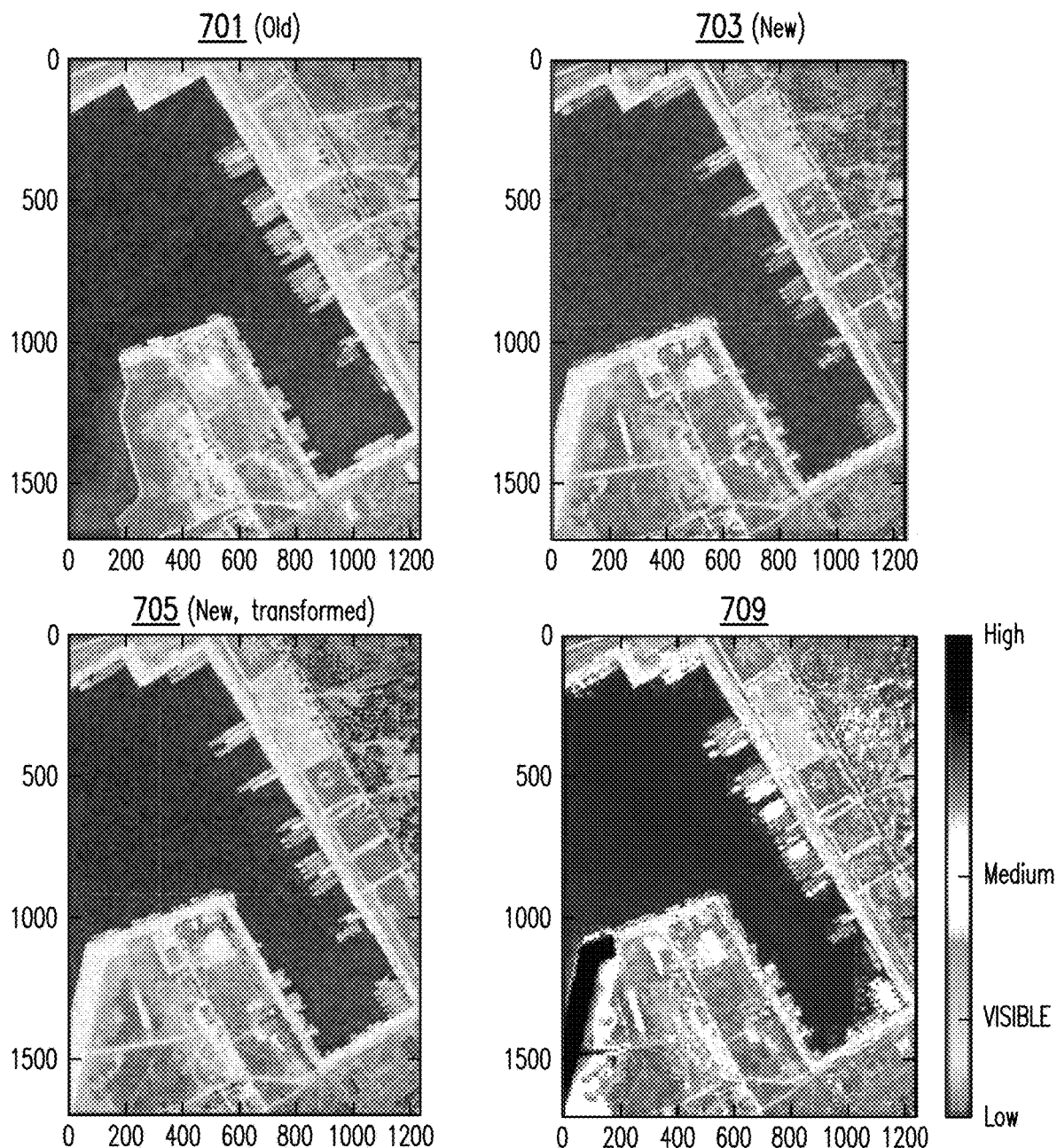
FIG. 7 is an example of a first (old) and a second (new) satellite image, transformed image, and a change detection heatmap visualization, according to some embodiments

The transformed satellite images from the smart transform module 215, user input 206, configuration file 208, and masks may be provided to a structural change detection module 220. In some embodiments, the structural change detection module 220 comprises an unsupervised algorithm, e.g., that clusters the satellite image data and associated masks into different classes to indicate spatio-temporal changes in the images. The structural change detection algorithm may output a change detection heatmap, examples of which are depicted in FIGS. 6-7. The change detection heatmap may define, for each satellite image pixel, a real number value from 0 to 1, where 0 corresponds to no structural change and 1 corresponds to most significant change detected. In some embodiments, the output change detection heatmap may be provided to and stored in data source 223.

The spatio-temporal heatmap, predicted masks, and user input may be provided to a change detection heatmap segmentation with masking logic module 225. Module 225 may comprise a heatmap segmentation algorithm that analyzes both input satellite images and a change detection heatmap generated by the structural change module 220 in order to produce a segmented change detection heatmap. Module 225 may further comprise a masking logic algorithm that produces a list of georeferenced attention regions for the input satellite images. The output may comprise a full set of vectorized spatio-temporal attention regions corresponding to the satellite images. In some embodiments, the vectorized spatio-temporal attention regions output information may be stored in data source 237.

FIG. 6 is a flow diagram of a process for using an unsupervised structural change detection algorithm, according to some embodiments. As shown in FIG. 6, a pair of satellite images are provided as input (e.g., satellite image data cube 202 and satellite image valid data mask 204 of FIG. 2) to the smart transform module 215, the smart transform module 215 outputs transformed versions 602/604 of the input satellite images 202 and masks of valid data 204, the transformed images 602/604 are then provided to the structural change detection module 220. The structural change detection module 220 outputs a change detection visualization 610, distinguishing areas of low, visible, medium, and high change detection, and change detection heatmap 615. The change detection heatmap segmentation with masking logic module 225, described below, may process the change detection heatmap 615 and output a segmented change detection heatmap visualization 610.

FIG. 7 is an example of a first (old) and a second (new) satellite image, transformed image, and a change detection heatmap visualization, according to some embodiments. As shown in FIG. 7, a pair of satellite images, including an old satellite image 701 and a new satellite image 703 is provided to change detection system 100. As part of the image processing, the new satellite image 703 may be transformed by the smart transform module 215 and output as a new transformed satellite image 705. In some embodiments, the new transformed satellite image 705 is co-registered with the old satellite image 701. The transformed satellite image 705 and the old satellite image 701 may be provided to the structural change detection module 220, which may output a heatmap 709. In some embodiments, the heatmap 709 may be further processed by change detection heatmap segmentation with masking logic module 225, which outputs a change heatmap that is scaled from 0 to 1, or low structural change to high structural change. The heatmap may be visualized over the new image 703 and/or 705, with a threshold of 0.2 (denoted as "visible" on the color bar).

Referring back to FIG. 2, the heatmap and attention regions output from module 225 may be provided to an attention region filtering module 230. Additionally, one or more filtering models and/or configuration files from data source 239 may be provided to the attention region filtering module 230. The filtering models and/or configuration files may, for example, reflect information or instructions derived from user input 206 regarding selection criteria for relevant attention regions. In some embodiments, the attention region filtering module 230 comprises an algorithm that provides as output filtered attention regions in the satellite images for change analysis. For example, the attention region filtering algorithm may select only the attention regions relevant for a change analysis (based on user input), and provide the spatio-temporal localization of such attention regions, an example of which is depicted in FIG. 7. In some embodiments, the attention region filtering module 230 may provide as output filtered vectorized spatio-temporal attention regions corresponding to the input images, which may optionally be stored in data source 233.

In some embodiments, the filtered attention regions stored in data source 233 may be used to generate one or more alerts for client device 120 and/or additional devices.

Figure 8:
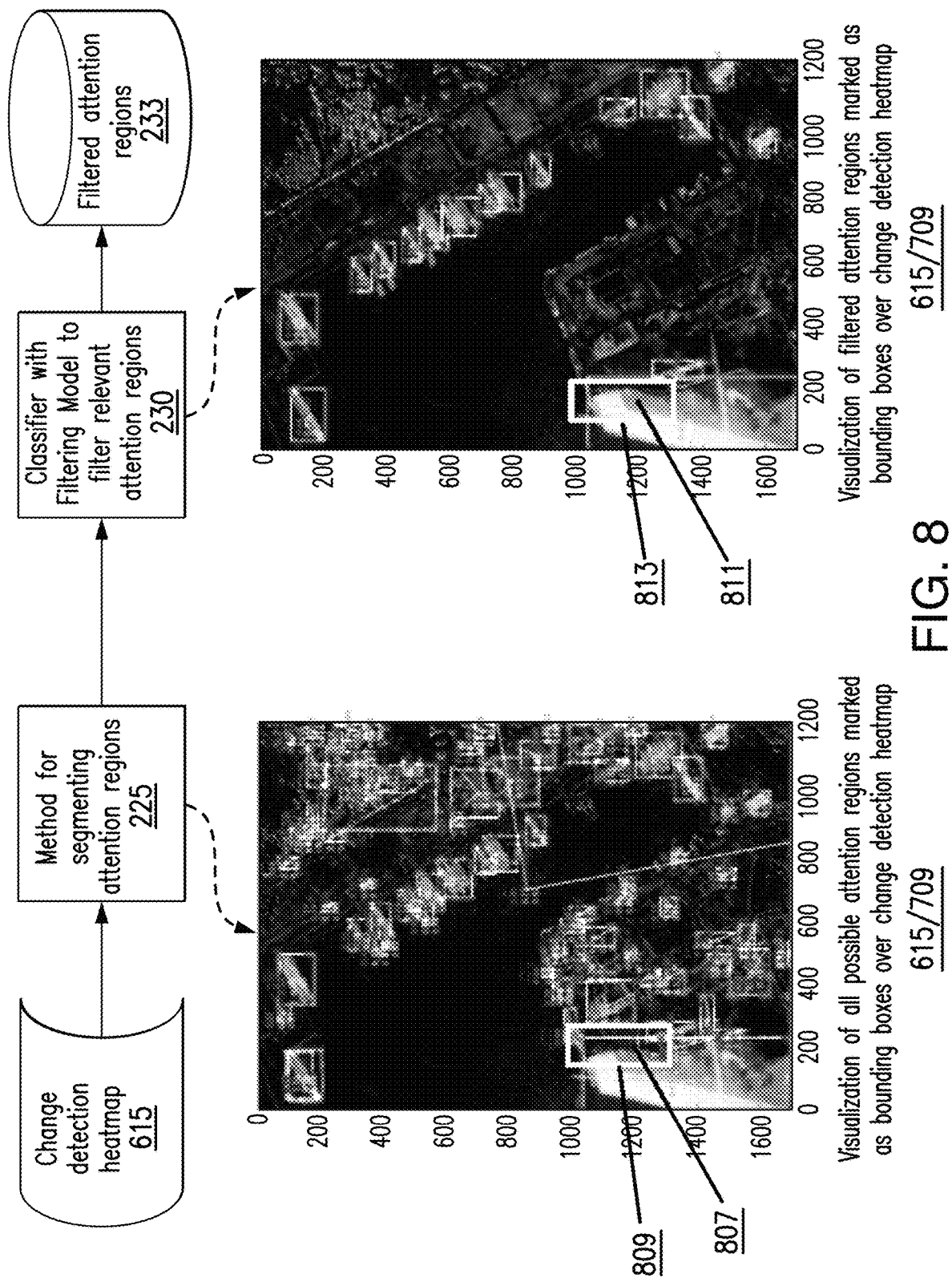
FIG. 8 is a flow diagram of a process for segmenting and filtering attention regions of a satellite image, according to some embodiments.

FIG. 8 is a flow diagram of a process for segmenting and filtering attention regions of a satellite image, according to some embodiments. As shown in FIG. 8, a change detection heatmap 615/709 may be provided to change detection heatmap segmentation with masking logic module 225. The change detection heatmap segmentation with masking logic module 225 may determine all possible attention regions in the input heatmap. FIG. 8 depicts an example output visualization of all possible attention regions over heatmap 615/709 from change detection heatmap segmentation with masking logic module 225. Each possible attention region 807 is marked with a bounding box 809 over the change detection heatmap 615/709. The output from change detection heatmap segmentation with masking logic module 225, comprising all the possible attention regions from change detection heatmap 615/709, is provided to the attention region filter module 230, which comprises a classifier with a filtering model to filter relevant attention regions. As described above, the relevant attention regions may be determined from user input 206 and/or filtering models and/or configuration information from data source 239. The filtered attention regions may be stored in data source 233. FIG. 8 depicts an example visualization of the filtered attention regions from the attention region filter module 230. The filtered attention regions 811 are marked with a bounding box 813 over the change detection heatmap 615/709. The training of the filtering classifier is described in further detail below in connection with FIG. 12

The method further includes web interface for selecting areas of interest, selecting dates of interest, searching for available satellite imagery, selection of satellite imagery to be analyzed, triggering the change detection analysis, visualization of results, and saving the visualized and vectorized results.

Figure 9:
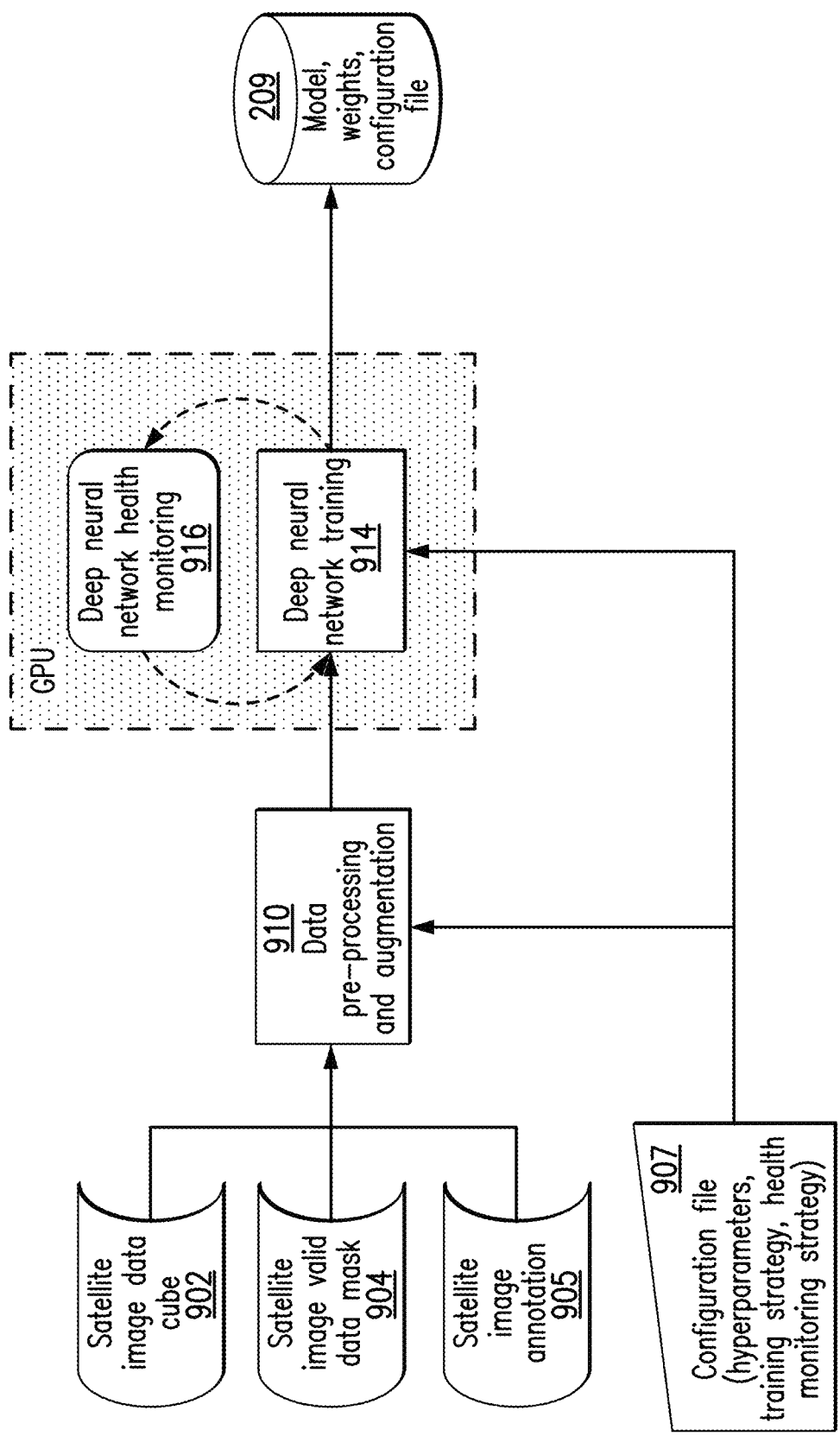
FIG. 9 is a data flow diagram of a process for training a deep neural network based masking model, according to some embodiments

FIG. 9 is a data flow diagram of a process for training a deep neural network based masking model, according to some embodiments. In some embodiments, the prediction using the trained model is performed by change detection system 100, and specifically mask prediction module 205.

Several input items including one or more of a satellite image data cube 902, a satellite image valid data mask 904, a satellite image annotation 905, and a configuration file 907 may be provided to a data pre-processing and augmentation module 910. In some embodiments, the satellite image annotation 905 information may be provided manually and/or automatically and comprise a description of the input satellite image. Examples of satellite image annotations are in FIG. 19. The configuration file 907 may comprise one or more hyperparameters, a training strategy, and a health monitoring strategy (such as proprietary performance metrics and training stopping criteria) for the mask prediction model.

The data pre-processing and augmentation module 910 may process the input items 902, 904, 905, and 907, and augment the input to create additional training parameters. Such augmentation may include, for example, rotating, cropping, or otherwise modifying an input satellite image in order to create additional training data.

The training data, including the augmented training data from data pre-processing and augmentation module 910, are provided to the mask prediction module 205. As described above, the mask prediction module 2015 may comprise a deep neural network. The neural network may be trained 914 using the annotated training data. Periodically, the health of the neural network may be monitored 916 using one or more performance metrics. The performance metrics may include accuracy, precision, recall, intersection over union, and may be tested periodically to ensure that the neural network is developing appropriately. The mask prediction module may output and store one or more models, weights, and configuration files in data source 209, which may be used by the mask prediction module 205 to predict a mask for one or more satellite images as described above in connection with FIG. 2. In some embodiments, the model description may comprise a structured text file. In some embodiments, the weights may comprise hundreds of millions of parameters. In some embodiments, the configuration file may be architecture-specific.

Figure 10:
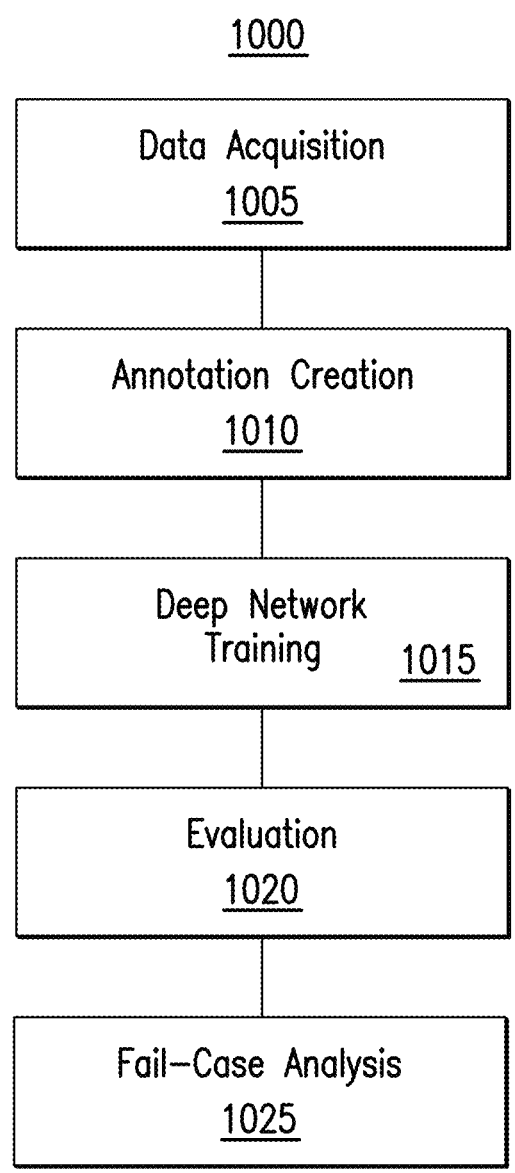
FIG. 10 is a flow diagram of a process for training a deep neural network based masking model, according to some embodiments.

FIG. 10 is a flow diagram of a process for training a deep neural network based masking model, according to some embodiments. In some embodiments, the change detection system performs process 1000 for training the deep neural network based masking module of mask prediction module 205.

At step 1005, data acquisition is performed, which may comprise one or more of: searching for relevant areas of interest in satellite images with objects of interest to be annotated; downloading a dataset using proprietary backend system 100; and filtering downloaded images in order to capture the highest possible data variance.

At step 1010, annotation creation is performed, which may comprise one or more of: manual and smart semi-automatic annotations (e.g., of objects or areas of interest in a satellite image); inter-annotator evaluation and match; and automatic checking, indexing, and backup of annotations.

At step 1015, deep network training is performed, which may comprise one or more of: image pre-processing; data set extension using augmentation; dataset generation; network architecture selection; training procedure execution; and monitoring of network health (e.g., using performance metrics).

At step 1020, evaluation is performed, which may comprise one or more of: computing metrics for performance monitoring; prediction on benchmark dataset with available ground truth annotations; computing and comparing benchmark scores; and visualization and visual inspection of scores.

At step 1025, a fail-case analysis is performed, which may comprise one or more of: identifying failures and weak spots, updating network architecture to improve performance; and updating and extending training dataset.

Figure 11:
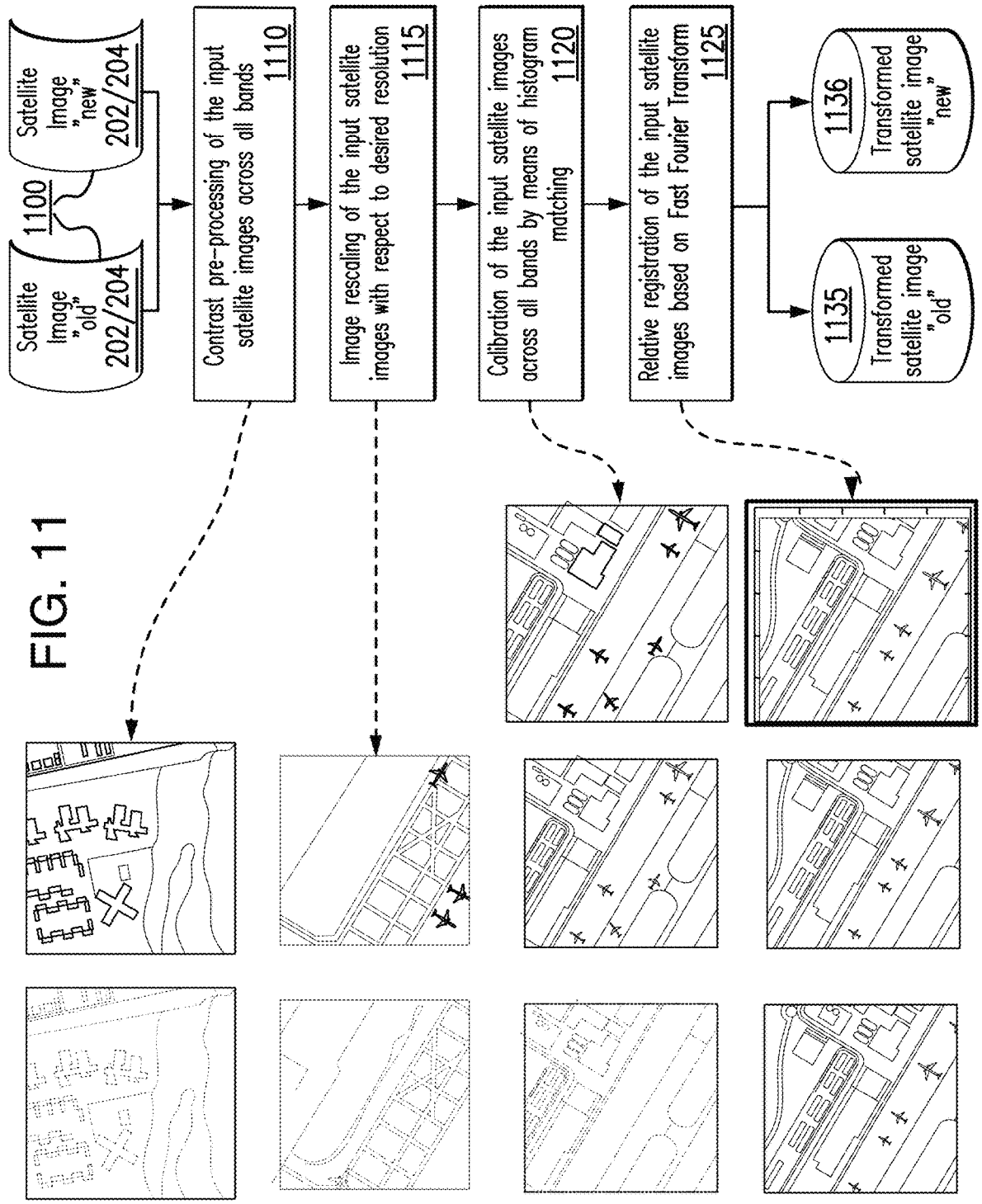
FIG. 11 is a data flow diagram of a process for smart transform of satellite images, according to some embodiments.

FIG. 11 is a flow diagram of a process for smart transform of satellite images, according to some embodiments. In some embodiments, the smart transform process 1100 is performed by change detection system 100, and more specifically, the smart transform module 215.

At step 1100, contrast-preprocessing across all bands may be performed on one or more input satellite images 202/204. As described above, satellite image cubes 202 may be of different spatial resolutions, and the contrast-preprocessing may be performed across any set or subset of spectral bands of the input satellite images 202/204.

At step 1115, image rescaling with respect to desired resolution is performed on the input satellite images 202/204. As described above, satellite image data cubes 202 may be of different resolutions. To account for the different resolutions, one or more of the input satellite images 202/204 may need to be rescaled with respect to a desired resolution. The desired resolution is the resolution of the satellite image that is used for change detection heatmap visualization. In some embodiments, the desired resolution may be specified by a user.

At step 1120, calibration across all bands is performed on the input satellite images 202/204. Since satellite image data cubes 202 may be multi-spectral, in some embodiments calibration across all bands may be performed based on histogram matching.

At step 1125, the input satellite images may be co-registered (i.e., relative spatial registration). In some embodiments, relative spatial registration may be based on a fast Fourier transform. The transformed and co-registered satellite images may be stored in one or more data sources 1135 and 1136.

Figure 12:
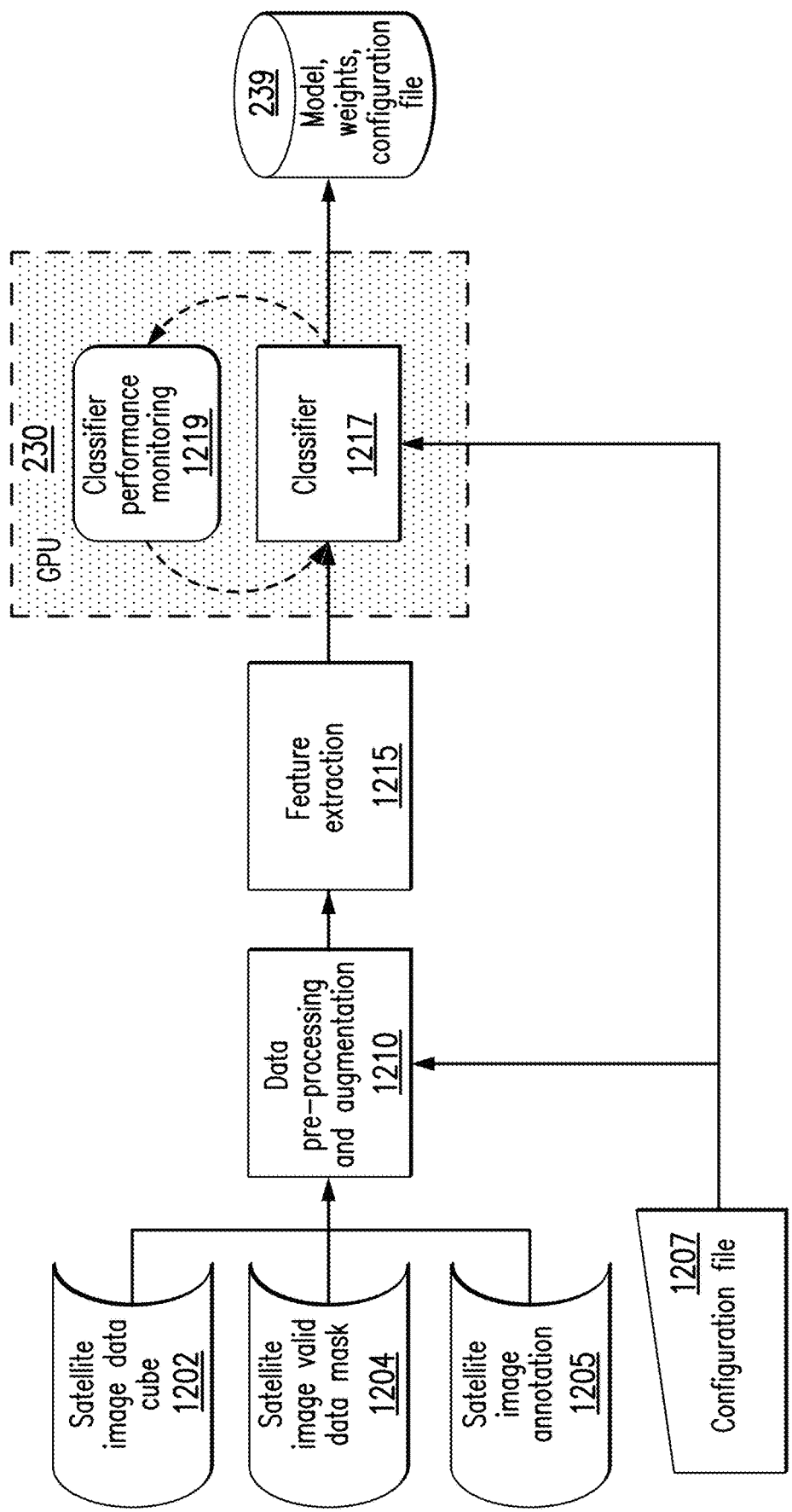
FIG. 12 is a data flow diagram of a process for training a filtering classifier, according to some embodiments.

FIG. 12 is a data flow diagram of a process for training a filtering classifier, according to some embodiments. In some embodiments, the training is performed offline to create filtering model as in FIG. 12. In some embodiments, the filtering classifier is applied as part of the attention region filtering module 230.

Several input items including one or more of a satellite image data cube 1202, a satellite image valid data mask 1204, a satellite image annotation 1205, and a configuration file 1207 may be provided to a data pre-processing and augmentation module 1210. In some embodiments, the satellite image annotation 1205 information may be provided manually and/or automatically and comprise a description of the input satellite image. Examples of annotations with corresponding satellite images are in FIG. 19. The configuration file 1207 may comprise computer readable instructions for performing change detection based on user input, such as objects of interest, areas of interests, selected date-time ranges, etc.

The data pre-processing and augmentation module 1210 may process the input items 1202, 1204, 1205, and 1207, and augment the input to create additional training parameters. Such augmentation may include, for example, rotating, cropping, or otherwise modifying an input satellite image in order to create additional training data.

The pre-processed and augmented training data may be provided to a feature extraction module 1215. The feature extraction module 1215 may extract all of the identified features in the input training data; in some embodiments, the features may be generic, not directly interpretable by human.

The extracted features and configuration file 1207 may be provided to attention region filtering module 230, which comprises a classifier 1217 and a performance monitor 1219. The classifier 1217 may classify the extracted features of the training images based on the configuration file. The performance monitor 1219 may monitor the performance of the classifier, and provide correction where necessary, for purposes of monitoring the training of the classifier. As the training of the classifier progresses, models, weights, and configuration files may be stored in data source 239.

Figure 13:
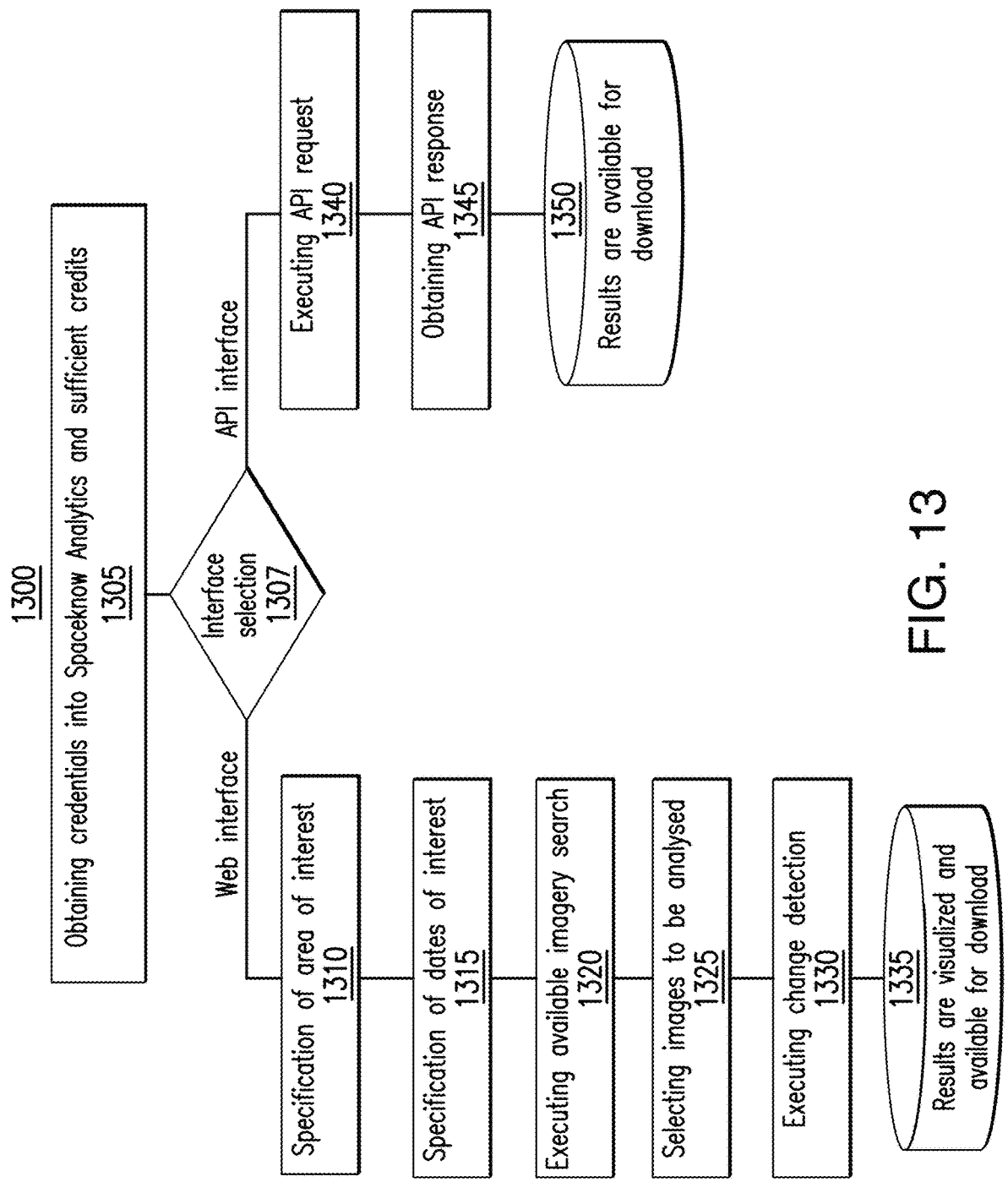
FIG. 13 is a flow diagram of a process for executing change detection analysis, according to some embodiments.

FIG. 13 is a flow diagram of a process for executing change detection analysis, according to some embodiments. In some embodiments, process 1300 is performed by change detection system 100.

At step 1305, credentials (e.g., username and password or other authentication credentials) are obtained. The credentials may be obtained from user device 120 over network 130 through an interface, such as an API or a web interface. In some embodiments, a determination is made whether sufficient credits are associated with the credentials for performing satellite image analysis. If there are insufficient credits, then process 1300 may stop.

Figure 14:
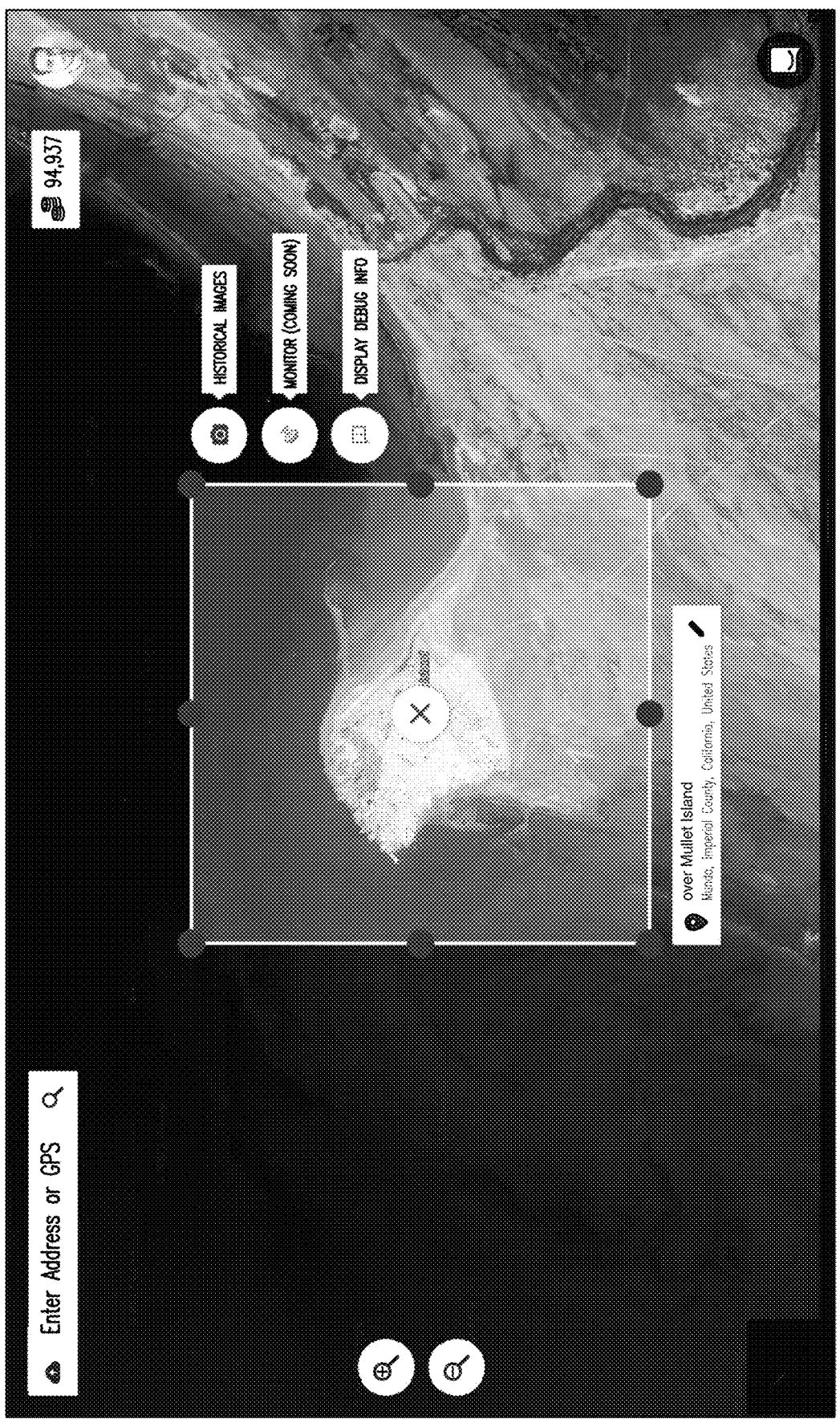
FIG. 14 is a screen capture of a web interface for selecting an area of interest for satellite image change detection, according to some embodiments.

At step 1307, an indication of an interface selection is obtained. In some embodiments, the interface may comprise one of a web interface or an API interface. As described above in connection with FIG. 1, user device 120 may communicate electronically with change detection system 100 over network 130 through an API or web interface.

Where a web interface is used by user device 120, then at step 1310, an area of interest is obtained. At step 1315 dates of interest are obtained. An exemplary web interface for selecting an AOI is shown in FIG. 14, and an exemplary web interface for selecting dates of interest is shown in FIG. 15.

At step 1320, an available imagery search is executed over a set of satellite images based on the area of interest and/or dates of interest. In some embodiments, the search may be performed by the backend of change detection system 100, and/or images may be obtained from one or more satellite image data repositories 115.

Figure 16:
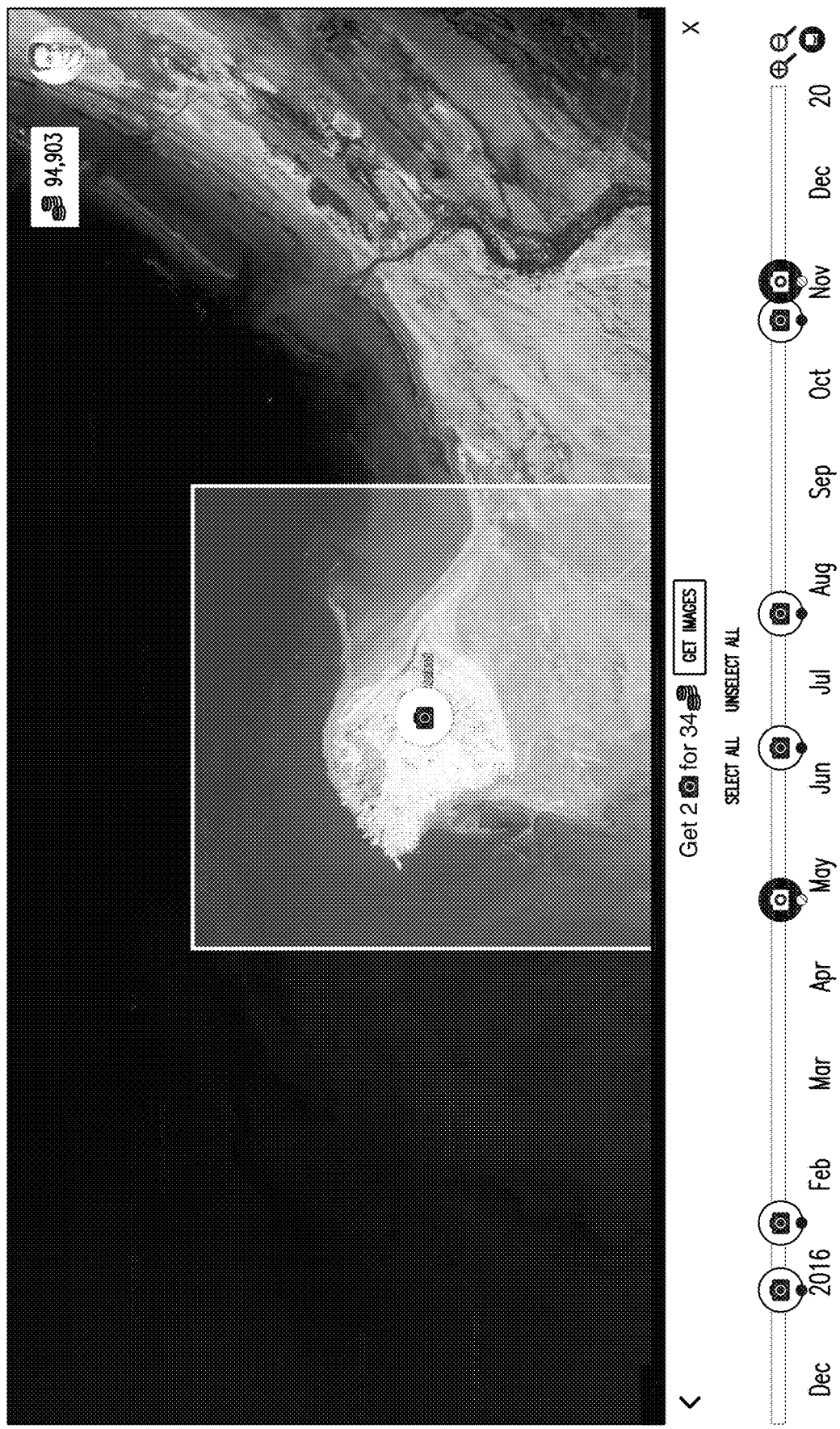
FIG. 16 is a screen capture of a web interface for selecting a plurality of images for change detection analysis, according to some embodiments.

At step 1325, a selection of images to be analyzed is obtained. In some embodiments, the selected images are the set or a subset of the satellite image search results from the search performed in step 1320. An exemplary web interface for selecting satellite images for change analysis is shown in FIG. 16.

In step 1330, a change detection process is performed. For example, the selected satellite images from step 1325 and the user data obtained in steps 1310 and/or 1320 may be provided to satellite change detection system 100 to perform the processes described above, such as in connection with FIG. 2.

Figure 17:
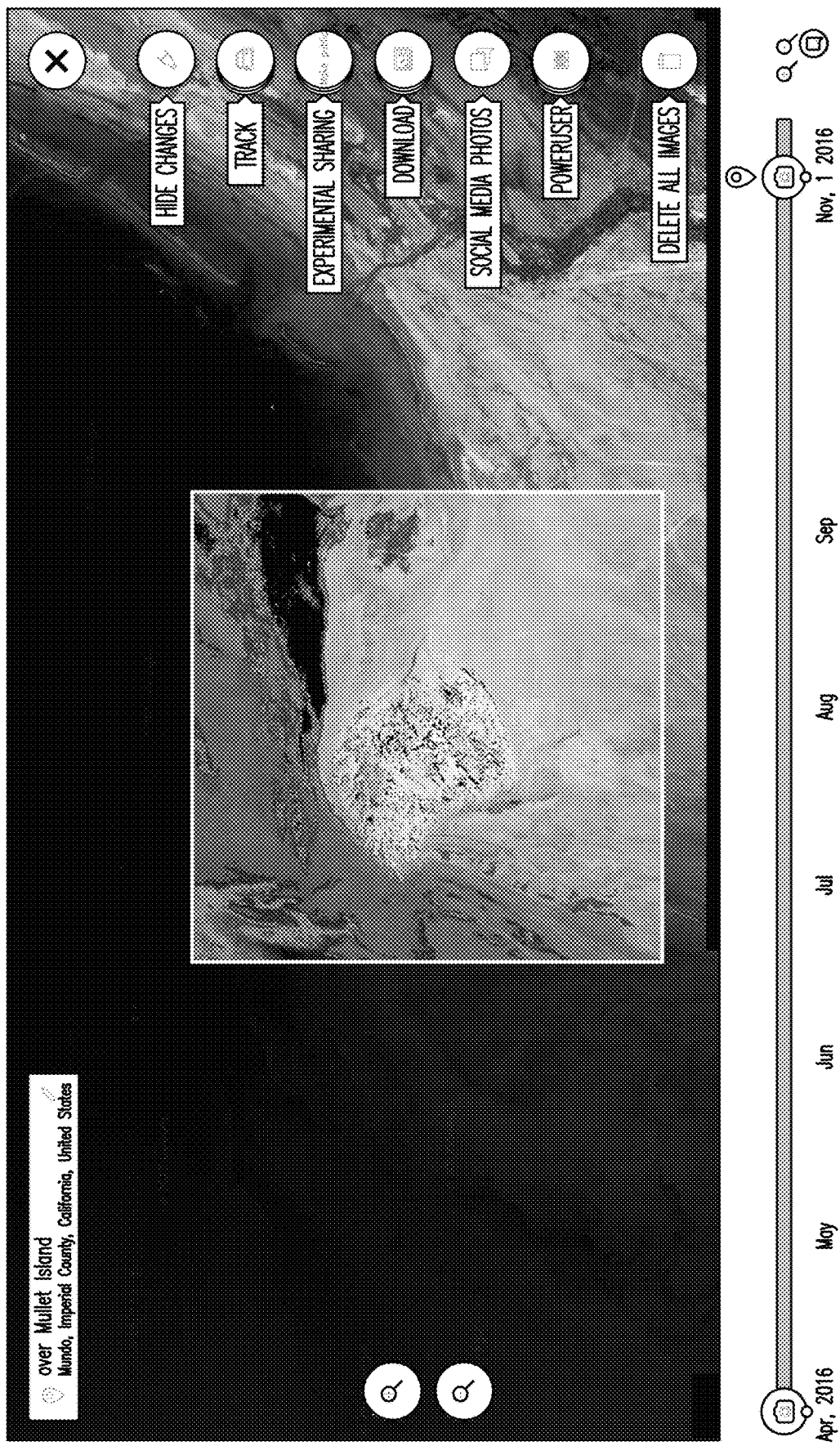
FIG. 17 is a screen capture of a web interface for visualizing change detection between a plurality of satellite images, according to some embodiments.

In step 1335, results of the change detection analysis are visualized on the web interface executing on user device 120. An exemplary web interface for visualizing the change detection analysis is shown in FIG. 17. In some embodiments, the visualizations are available for download to the user device 120.

If the selected interface is determined to be an API interface at step 1307, then process 1300 proceeds to step 1340, where the API request is executed. For example, the API request may be a change detection request over one or more satellite images. In step 1345, an API response is obtained. In step 1350 the API response, correlating to the results of the change detection request over two or more satellite images, may be made available for download to a user device 120.

FIGS. 14-17 are screen captures of an exemplary web interface, according to some embodiments. FIG. 14 is a screen capture of a web interface for selecting an area of interest for satellite image change detection, according to some embodiments. In FIG. 14, a web interface is provided to enable a user of user device 120 to select an area of interest to be analyzed by change detection system 100. As shown in FIG. 14, a graphical user interface may be provided that allows the user to zoom in and out of a satellite image and select an AOI by dragging an interactive display element over the AOI.

FIG. 15 is a screen capture of a web interface for selecting a range of dates for satellite image change detection, according to some embodiments. FIG. 15 depicts a selected area of interest, as well as an interactive time bar that allows a user to select a range of dates. While the dates shown in FIG. 15 are segmented by year, a person of skill in the area would appreciate that the date segments may be longer (e.g., decades) or shorter (e.g., days). Additionally, other user interactive elements may be used to select a date range, such as a drop down menu, a calendar, and the like. The selected range of dates and AOI may be used by a backend system of change detection system 100 to search for available images.

FIG. 16 is a screen capture of a web interface for selecting a plurality of images for change detection analysis, according to some embodiments. FIG. 16 depicts an interactive menu with satellite image search results that match the selected AOI and dates selected by the user. In some embodiments, metadata about a responsive satellite image may also be displayed in the web-interface. The metadata may include information about the capture date, provider of the image, satellite, resolution, etc.

FIG. 17 is a screen capture of a web interface for visualizing change detection between a plurality of satellite images, according to some embodiments. As shown in FIG. 17, one satellite image is depicted with change detection heatmap overlay. The highlighted change detection heatmap corresponds to detected change between the two selected images.

Figure 18:
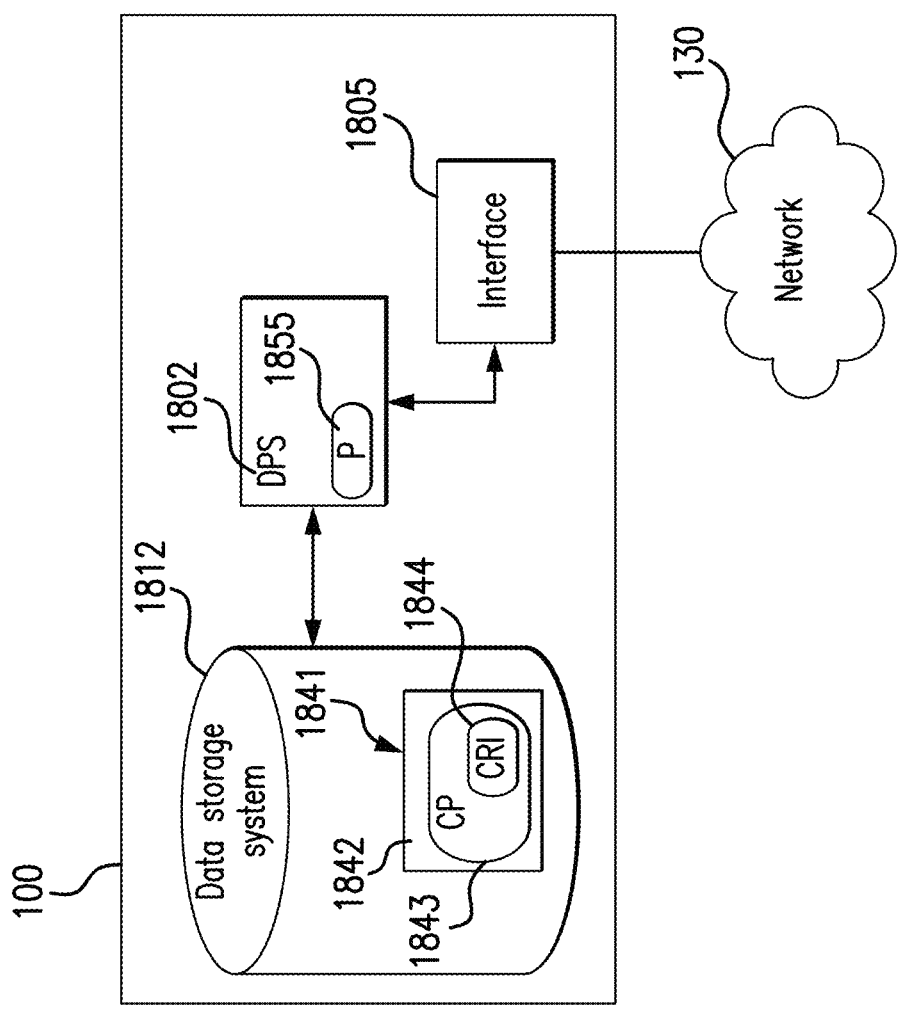
FIG. 18 is a block diagram of a satellite image change detection system according to some embodiments.

FIG. 18 is a block diagram of a satellite image change detection system 100 according to some embodiments. As shown in FIG. 18, change detection system 100 may comprise: a data processing system (DPS) 1802, which may include one or more processors 1855 (e.g., a general purpose microprocessor and/or one or more other data processing circuits, such as an application specific integrated circuit (ASIC), field-programmable gate arrays (FPGAs), and the like); a network interface 1805 for use in connecting satellite image analysis system 100 to network 130; and local storage unit (a.k.a., "data storage system") 1812, which may include one or more non-volatile storage devices and/or one or more volatile storage devices (e.g., random access memory (RAM)). In embodiments where change detection system 100 includes a general purpose microprocessor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, but not limited to, magnetic media (e.g., a hard disk), optical media (e.g., a DVD), memory devices (e.g., random access memory), and the like. In some embodiments, the CRI 1844 of computer program 1843 is configured such that when executed by data processing system 1802, the CRI causes the satellite image analysis system 100 to perform steps described above (e.g., steps described above with reference to the flow charts). In other embodiments, change detection system 100 may be configured to perform steps described herein without the need for code. That is, for example, data processing system 1802 may consist merely of one or more ASICs. Hence, the features of the embodiments described herein may be implemented in hardware and/or software.

Figure 19:
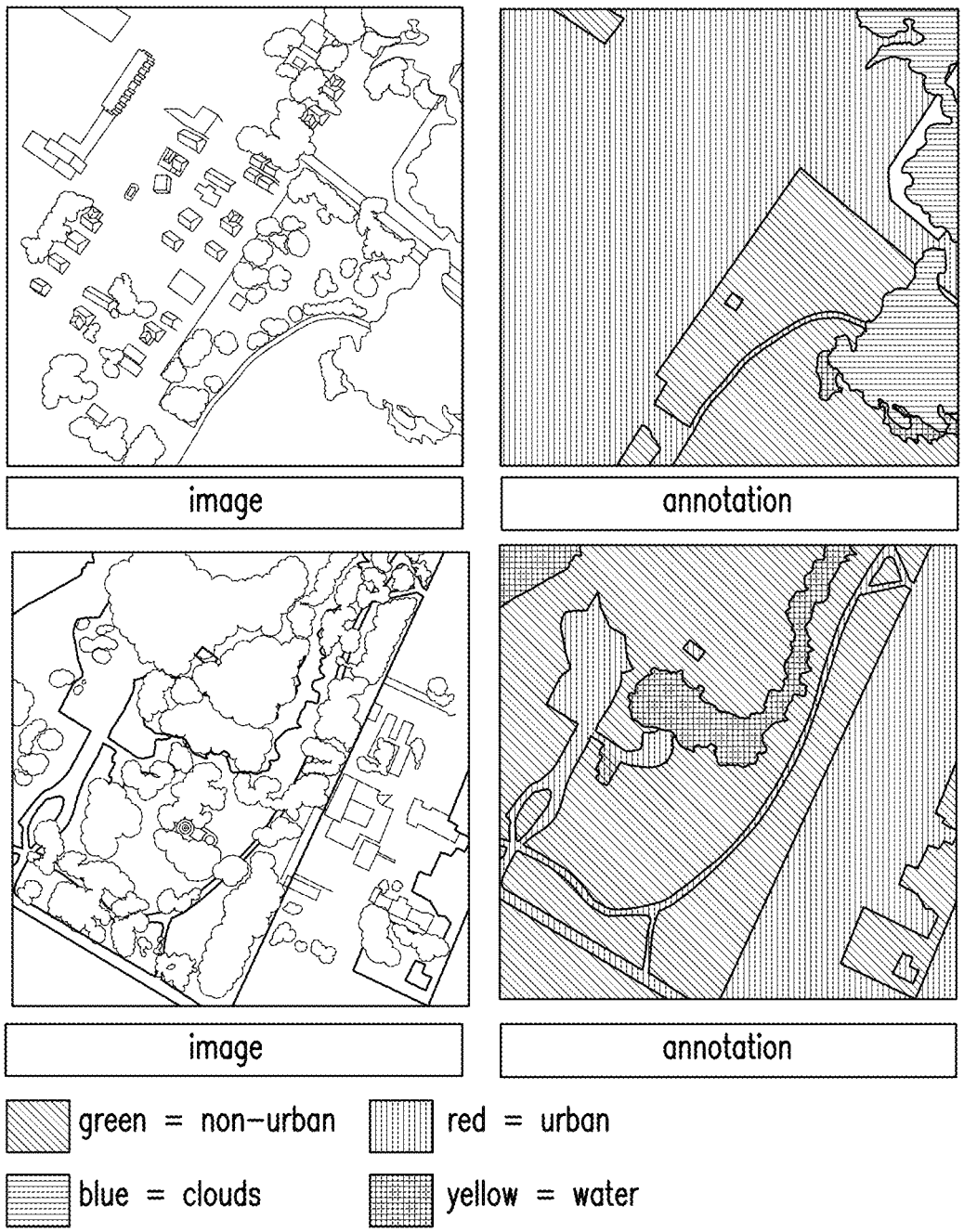
FIG. 19 is an example of annotated satellite images, according to some embodiments.

FIG. 19 is an example of annotated satellite images, according to some embodiments. Two satellite images are depicted in FIG. 19, each with annotations corresponding to "non-urban," "urban," "clouds," and "water" regions depicted in the image, each region corresponding to a respective color (e.g., "green" for "non-urban" regions).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method for change detection analysis on multi-spectral resolution satellite images, comprising:

obtaining, by a processor, a first satellite image at a first multi-spectral resolution and a second satellite image at a second multi-spectral resolution different than the first resolution;

receiving, by the processor over a network, a user input from a remote client pertaining to an instruction for analyzing the first and second satellite images;

generating, by the processor, a first mask for the first satellite image and a second mask for the second satellite image using said user input;

automatically identifying, by the processor, one or more spatio-temporal changes over a geographical location depicted in the first satellite image and the second satellite image, wherein the identifying comprises clustering satellite image data of the first and second satellite images and the first and second masks into different classes;

generating, by the processor, a graphical visualization of the identified one or more spatio-temporal changes over the geographical location; and transmitting, by the processor, the graphical visualization over said network for display on a graphical user interface of said remote client, wherein the generating the first mask and the second mask comprises providing the first satellite image and the second satellite image as input to a deep neural network based masking model, and wherein the generating the first mask and the second mask further comprises generating using the deep neural network based masking model, a first probability heatmap of the first mask and a second probability heatmap of the second mask, wherein the first probability heatmap and the second probability heatmap are generated using a statistical decision model based on a precision-recall curve analysis.

2. The method of claim 1, further comprising generating a change detection configuration file using the user input, the change detection configuration file comprising one or more parameters describing a type of spatio-temporal change to detect between the first satellite image and the second satellite image.

3. The method of claim 2, wherein a type of spatio-temporal change comprises a change of location or identification of one or more objects of interest over the geographical location.

4. The method of claim 1, wherein the first mask and the second mask are each at least one of a binary mask or a multi-class mask.

5. The method of claim 1, further comprises generating a change detection heatmap, the change detection heatmap defining, for each satellite image pixel, a real number value from 0 to 1, where 0 corresponds to no spatio-temporal change and 1 corresponds to most significant spatio-temporal change detected.

6. The method of claim 5, wherein generating a graphical visualization of the identified one or more spatio-temporal changes comprises:
   segmenting the change detection heatmap;
   generating a list of georeferenced attention regions for the first satellite image and second satellite image based on the segmenting; and,
   outputting one or more vectorized spatio-temporal attention regions.

7. The method of claim 6, wherein the vectorized spatio-temporal attention regions are determined from the user input and are marked with a bounding box over the change detection heatmap.

8. A non-transitory computer readable medium storing instructions configured to cause a computer to perform the method of claim 1.

9. A system for change detection analysis on multi-spectral resolution satellite images, comprising:
   a processor;
   a non-transitory computer readable memory coupled to said processor; and,
   a network interface coupled to said processor and to a network, wherein the processor is configured to:
   obtain a first satellite image at a first multi-spectral resolution and a second satellite image at a second multi-spectral resolution different than the first resolution;
   receive, using the network interface, user input over the network from a remote client pertaining to an instruction for analyzing the first and second satellite images;
   generate a first mask for the first satellite image and a second mask for the second satellite image using said user input;
   automatically identify one or more spatio-temporal changes over a geographical location depicted in the first satellite image and the second satellite image, wherein the identifying comprises clustering satellite image data of the first and second satellite images and the first and second masks of the first satellite image into different classes;
   generate a graphical visualization of the identified one or more spatio-temporal changes over the geographical location; and
   transmit, using the network interface, the graphical visualization over said network, for display on a graphical user interface of said remote client,
   wherein the processor is further configured to:
   generate a change detection heatmap, the change detection heatmap defining, for each satellite image pixel, a real number value from 0 to 1, where 0 corresponds to no spatio-temporal change and 1 corresponds to most significant spatio-temporal change detected;
   segment the change detection heatmap;
   generate a list of georeferenced attention regions for the first satellite image and second satellite image based on the segmenting; and,
   output one or more vectorized spatio-temporal attention regions.

10. The system of claim 9, wherein the vectorized spatio-temporal attention regions are determined from the user input and are marked with a bounding box over the change detection heatmap.

* * * * *